(12) United States Patent
Behera et al.

(10) Patent No.: US 10,143,029 B2
(45) Date of Patent: Nov. 27, 2018

(54) DEVICE AND METHOD FOR RECOVERING SERVICES FROM NETWORK REJECTIONS TO WIRELESS COMMUNICATION DEVICES

(71) Applicant: Intel IP Corporation, Santa Clara, CA (US)

(72) Inventors: Manas Behera, Nuremberg (DE); Anuj Sethi, Nuremberg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/584,103

(22) Filed: May 2, 2017

(65) Prior Publication Data
US 2017/0353939 A1    Dec. 7, 2017

(30) Foreign Application Priority Data
Jun. 1, 2016  (EP) ..................... 16172393

(51) Int. Cl.
| | |
|---|---|
| *H04W 76/18* | (2018.01) |
| *H04W 76/19* | (2018.01) |
| *H04W 8/20* | (2009.01) |
| *H04W 60/00* | (2009.01) |
| *H04B 1/3816* | (2015.01) |

(Continued)

(52) U.S. Cl.
CPC .......... *H04W 76/18* (2018.02); *H04B 1/3816* (2013.01); *H04W 4/14* (2013.01);
(Continued)

(58) Field of Classification Search
CPC ...... H04B 1/3816; H04W 60/04; H04W 4/15; H04W 8/04; H04W 8/18; H04W 24/02;
(Continued)

(56) References Cited

U.S. PATENT DOCUMENTS

| | | | |
|---|---|---|---|
| 2010/0081434 A1* | 4/2010 | Ahluwalia | H04W 60/06 455/435.1 |
| 2012/0135715 A1* | 5/2012 | Kang | H04W 8/183 455/412.1 |

(Continued)

OTHER PUBLICATIONS

The extended European Search Report based on Application No. 16172393.7(6 Pages) dated Nov. 11, 2016 (Reference Purpose Only).

*Primary Examiner* — William Nealon
(74) *Attorney, Agent, or Firm* — Viering, Jentschura & Partner mbB

(57) ABSTRACT

A wireless communication device is described in one example comprising a first communication module circuitry to communicatively couple the wireless communication device with a first network, the first communication module circuitry to receive a reject message from the first network to disable communications with the first network, a processor to store, in memory, information corresponding to the communications with the first network; and a second communication module circuitry to communicatively couple the wireless communication device with a second network, the second communication module circuitry to send the information to a remote service monitor, wherein the first communication module circuitry includes a first Subscriber Identity Module (SIM) or a first virtual SIM and the second communication module circuitry includes a second SIM or a second virtual SIM. Other embodiments may be described and/or claimed.

9 Claims, 12 Drawing Sheets

(51) Int. Cl.
*H04W 4/14* (2009.01)
*H04W 8/04* (2009.01)
*H04W 8/18* (2009.01)
*H04W 24/02* (2009.01)
*H04W 60/04* (2009.01)
*H04W 88/06* (2009.01)

(52) U.S. Cl.
CPC ............... *H04W 8/04* (2013.01); *H04W 8/18* (2013.01); *H04W 8/205* (2013.01); *H04W 24/02* (2013.01); *H04W 60/005* (2013.01); *H04W 60/04* (2013.01); *H04W 76/19* (2018.02); *H04W 88/06* (2013.01)

(58) Field of Classification Search
CPC .. H04W 76/027; H04W 76/028; H04W 88/06
USPC ...................................... 455/435.2
See application file for complete search history.

(56) References Cited

U.S. PATENT DOCUMENTS

| | | | | |
|---|---|---|---|---|
| 2012/0172011 A1* | 7/2012 | Gupta | .................. | H04W 68/02 |
| | | | | 455/414.1 |
| 2013/0005394 A1* | 1/2013 | Geary | ................. | H04W 52/028 |
| | | | | 455/552.1 |
| 2013/0303164 A1* | 11/2013 | Seo | .................... | H04W 76/027 |
| | | | | 455/435.1 |
| 2015/0358898 A1 | 12/2015 | Lair et al. | | |
| 2016/0020800 A1* | 1/2016 | Krishnamoorthy | .. | H04B 1/3816 |
| | | | | 455/423 |

* cited by examiner

DEVICE AND METHOD FOR RECOVERING SERVICES FROM NETWORK REJECTIONS TO WIRELESS COMMUNICATION DEVICES

CROSS-REFERENCE TO RELATED APPLICATION

This application claims priority to European Patent Application Serial No. 16 172 393.7, which was filed Jun. 1, 2016, and is incorporated herein by reference in its entirety.

TECHNICAL FIELD

Embodiments described herein generally relate to wireless communication devices, methods, and systems for recovering services from network rejections to wireless communication devices.

BACKGROUND

Modern wireless communications may involve a variety of wireless communication devices. Wireless communication devices may be traditional entry phones for receiving and/or sending phone call signals, including receiving and/or sending Short Message Service (SMS). Wireless communication devices may be smart phones for more advanced communications, for example, for receiving and/or sending not only phone call signals but also data signals. The wireless communication devices may include slots for a plurality of Subscriber Identity Module (SIM) cards. The wireless communication devices may support physical SIM cards and/or virtual SIM cards as well. The wireless communication devices with a plurality of physical or virtual SIM cards may allow easier roaming or separate numbers for different use on a same device. Wireless communication devices may also be Internet of Things (IoT) devices that are embedded with electronics, software, sensors, and network connectivity enabling the IoT devices to collect and/or exchange data amongst physical objects of the IoT such as devices, vehicles, buildings, and other items. Communications of wireless communication devices may be interrupted or suspended if the wireless communication devices are rejected by networks for many causes. Therefore, an effective recovery from rejections of networks may be desired for better communications.

BRIEF DESCRIPTION OF THE DRAWINGS

In the drawings, like reference characters generally refer to the same parts throughout the different view. The drawings are not necessarily to scale, emphasis instead generally being place upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
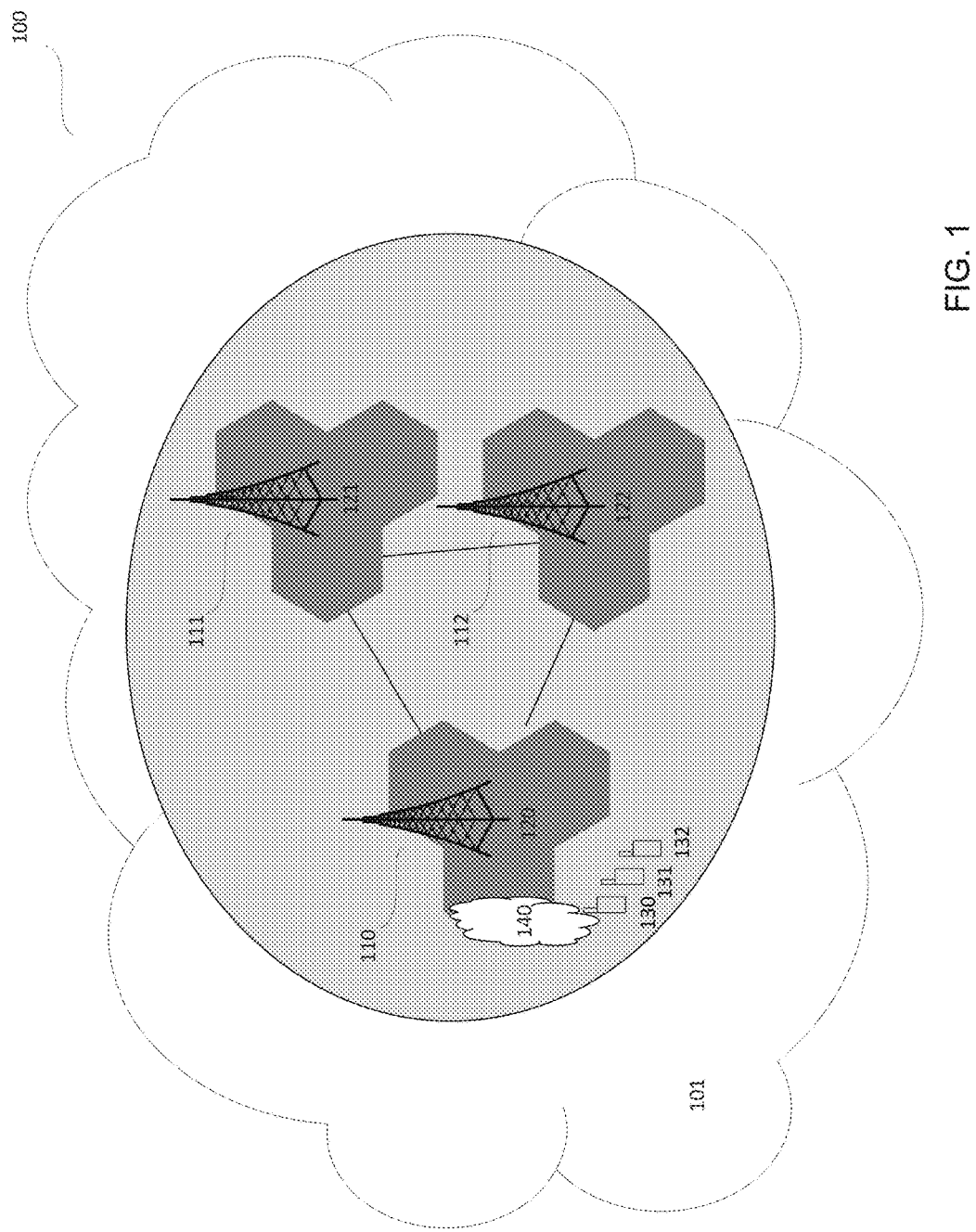
FIG. 1 shows a wireless communication system applicable for a variety of networks in accordance with some embodiments.

FIG. 1 shows a wireless communication system 100, for example, a Global System for Mobile communications (GSM), an Enhanced Data rates for GSM Evolution (EDGE), a Universal Mobile Telecommunication System (UMTS), a Long Term Evolution (LTE) wireless communication system, or systems beyond LTE, for example, a $5^{th}$ Generation (5G) wireless communication system in accordance with some embodiments.

The wireless communication system 100 may, for example, include a network 101, also referred to as a radio access network 101. The network 101 may be, for example, Universal Terrestrial Radio Access Network (UTRAN). The network 101 may be, for example, GSM EDGE Radio Access Network (GERAN). The network 101 may be, for example, an Evolved UMTS Terrestrial Radio Access Network according to LTE (E-UTRAN).

The network 101 may include base stations 120-122 (e.g. eNodeBs, eNBs). Each base station, for example, base station 120 may provide radio coverage for one or more mobile radio cells, for example, mobile radio cell 110 of the network 101. Likewise, base station 121 may provide radio coverage for mobile radio cell 111 of the network 101, and base station 122 may provide radio coverage for mobile radio cell 112 of the network 101.

A plurality of wireless communication devices 130-132, also referred to as mobile terminals, User Equipment (UEs), Mobile Stations (MS), mobile devices, receivers, transmitters, or transceivers, may be located in the mobile radio cell 110 of the wireless communication system 100. A wireless communication device, for example, wireless communication device 130 may communicate with other wireless communication devices, for example, wireless communication device 131 or 132 via a base station, for example, base station 120 providing coverage for (in other words, operating) the mobile radio cell, for example, mobile radio cell 110.

For radio communications via an air interface channel, for example, channel 140, a wireless communication device, for example, wireless communication device 130 may include a chain of Radio Frequency (RF) components, and a plurality of antennas, and a baseband processor. A chain of RF components which may also be referred to as an RF chain may include an RF receiver, an RF transmitter, or an RF transceiver. A plurality of antennas may form multiple antenna arrays. A baseband processor may include, for example, an analog baseband to provide analog signal processing, an Analog-to-Digital Converter (ADC) and Digital-to-Analog Converter (DAC) to provide conversions between the analog and digital domains, and a digital baseband to provide digital signal processing. A chain of RF components may be also a physical RF block that may process multiple parallel signals.

A wireless communication device, for example, wireless communication device 130 may include slots for a plurality of SIM cards. In some embodiments, the wireless communication device 130 may include slots for two SIM cards, also referred to as dual SIM wireless communication device 130. The dual SIM wireless communication device 130 may include an adapter to switch between the two SIM cards when required. The dual SIM wireless communication device 130 may include a chain of RF components shared by the two SIM cards. The device 130 may be only able to send and/or receive signals and/or data on one SIM card at the time. The dual SIM wireless communication device 130 may allow the two SIM cards to be accessed through time multiplexing. The device 130 may lock to an active channel for sending and/or receiving signals and/or data, and ignore the other channel and thus make it unavailable during the duration of sending and/or receiving signals and/or data on the active channel. The dual SIM wireless communication device 130 may include two chains of RF components. Each of the two chains of RF components may be capable of sending and/or receiving signals and/or data on both of the two SIM cards. In some embodiments, the dual SIM wireless communication device 130 may include a first communication module circuitry that performs wireless receiving and/or transmitting in compliance with at least a first wireless communication technology. The dual SIM wireless communication device 130 may include a second communication module circuitry that performs wireless receiving and/or transmitting in compliance with at least a second wireless communication technology.

The wireless communication device, for example, wireless communication device 130, may be within coverage of one or more mobile communication networks that may operate according to a same RAT (Radio Access Technology) or according to different RATs.

The network 101 may support communications according to various communication technologies, e.g. mobile communication standards. Each base station, for example, base station 120 may provide a radio communication connection via an air interface channel, for example, channel 140 between the base station 120 and a wireless communication device, for example, wireless communication device 130 according to 5G, LTE, UMTS, EDGE, or GSM radio access.

Figure 2:
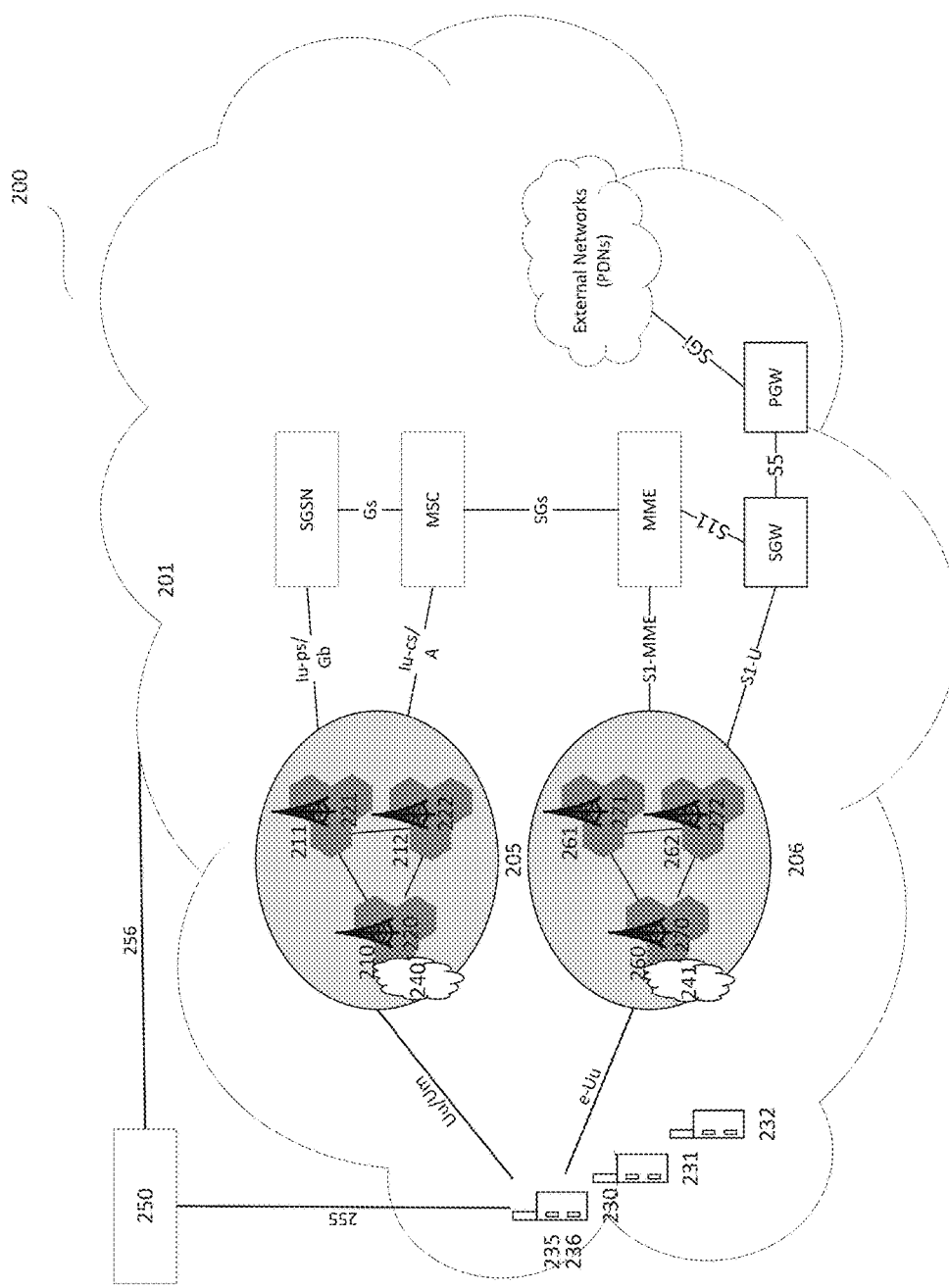
FIG. 2 shows an example scenario of a service center communicating with wireless communication systems in accordance with some embodiments.

FIG. 2 shows an example scenario 200 of a service center communicating with wireless communication systems in accordance with some embodiments. The scenario 200 depicts communications amongst service centers, for example, a service center 250, networks, for example, a network 201, wireless communication devices, for example, wireless communication devices 230, 231 and 232, and communications between the wireless communication device 230 and wireless communication systems, for example, wireless communication systems 205 and 206.

The wireless communication devices 230, 231 and 232 may rely on the network 201 for a variety of communication services including Circuit-Switched (CS) and Packet-Switched (PS) data transfer. The network 201 may include a legacy network composed of a UTRAN/GERAN providing radio access coverage for a wireless communication system, for example, wireless communication system 205, and further composed of a Service General Packet Radio Service (GPRS) Support Node (SGSN), and a Mobile Switching Center (MSC). The network 201 may also include an LTE network composed of a EUTRAN providing radio access coverage for a wireless communication system, for example, wireless communication system 206, and further composed of a Mobility Management Entity (MME), a Serving Gateway (SGW), and a Packet Data Network (PDN) Gateway (PGW). The network 201 may thus include both radio access components, for example, the UTRAN/GERAN and the EUTRAN, and core network components, for example, the SGSN, MSC, MME, SGW, and PGW. Moreover, network diagrams for the network 201 illustrated by FIG. 2 may focus on Circuit Switched Fall Back (CSFB) procedures and associated network entities; accordingly, the network 201 may include additional components that are not explicitly shown in FIG. 2. For example, the LTE core network that includes the MME, SGW, and PGW in FIG. 2 may additionally include a Home Subscriber Service (HSS) for storing subscriber information, a Policy Charging Rules Function (PCRF) server responsible for managing service and billing policies for each subscriber, and one or more additional LTE network components. Likewise, the legacy core network may additionally include a Gateway GPRS Support Node (GGSN) to interface between the SGSN and external PDNs, a Visitor Location Register (VLR) responsible for managing user information for the MSC, a Gateway MSC (GMSC) interfacing the MSC with external CS networks such as a Public Switched Telephone Network (PSTN) and/or Integrated Services Digital Network (ISDN), a Home Location Register (HLR) responsible for managing user information for the entire legacy network, and one or more additional GSM and/or UMTS network components. Furthermore, although FIG. 2 depicts the core network components of the LTE and legacy networks as single entities, the network 201 may include more than one SGSN, MSC, MME, SGW, PGW, etc., where each respective component may, for example, serve wireless communication devices located in a specific geographic area. The UTRAN/GERAN of the network 201 is depicted collectively in FIG. 2 for practicality, and may be composed of either one or both of a UTRAN and a GERAN. The EUTRAN may be composed of one or more eNodeBs that are connected via X2 interfaces while the GERAN/UTRAN may be composed of one or more Base Transceiver Stations (BTSs), Base Station Controllers (BSCs), NodeBs, and/or Radio Network Controllers (RNCs). The wireless communication device 230 may rely on such radio access nodes of network 201 as a radio interface to exchange data with internal and external components of the core network of the network 201.

The wireless communication system 205 covered by the network 201 may include base stations 220-222 (e.g. eNodeBs, eNBs). Each base station, for example, base station 220 may provide radio coverage for one or more mobile radio cells, for example, mobile radio cell 210 of the network 201, base station 221 may provide radio coverage for mobile radio cell 211 of the network 201, and base station 222 may provide radio coverage for mobile radio cell 212 of the network 201. As shown, the wireless communication system 205 may apply UTRAN and/or GERAN, and support both CS and PS according to 3rd Generation Partnership Project (3GPP). A CS network may support switches within telephone exchanges creating a continuous wire circuit between two telephones, for as long as a call between the two telephones lasts. A PS network may divide data to be transmitted into packets transmitted through the network independently. A CS network and a PS network, also referred to as a CS domain and a PS domain, are independent to each other for connections according to 3GPP.

Likewise, the wireless communication system 206 covered by the network 201 may include base stations 270-272 (e.g. eNodeBs, eNBs). Each base station, for example, base station 270 may provide radio coverage for one or more mobile radio cells, for example, mobile radio cell 260 of the network 201, base station 271 may provide radio coverage for mobile radio cell 261 of the network 201, and base station 272 may provide radio coverage for mobile radio cell 262 of the network 201. As shown, the wireless communication system 206 may apply EUTRAN, and support only PS according to 3GPP.

A plurality of wireless communication devices 230-232, also referred to as mobile terminals, User Equipment (UEs), Mobile Stations (MS), mobile devices, receivers, transmitters, or transceivers, may be located in the network 201. A wireless communication device, for example, wireless communication device 230 may communicate with base stations of wireless communication systems via air interface channels. For example, the wireless communication device 230 may communicate with base station 220 covering mobile radio cell 210 of wireless communication system 205 via an air interface channel 240. For example, the wireless communication device 230 may communicate with base station 270 covering mobile radio cell 260 of wireless communication system 206 via an air interface channel 241.

In some embodiments, the wireless communication device 230 may be, for example, the same as the wireless communication devices described according to FIG. 1. In some embodiments, the wireless communication device 230 may be also, for example, IoT devices. IoT devices may be sensed and controlled remotely across existing network infrastructure or internet infrastructure. A plurality of IoT devices may directly integrate a physical world into computer-based systems. IoT devices may be a variety of devices embedded with electronics, software, sensor and network connectivity, for example, heart monitoring implants, automobiles with built-in sensors, field operation devices that assist firefighters in search and rescue, etc. IoT devices may go beyond Machine-to-Machine (M2M) communications and cover a variety of protocols, domains, and applications, for example, smart grids, smart homes, and expand to the areas such as intelligent transportation, and smart cities.

In some embodiments, the wireless communication device 230 may, for example, include slots for a plurality of SIM cards. Hereafter, for ease of illustration, the wireless communication device 230 may include slots for two SIM cards or two UMTS SIM (USIM) cards, for example, a first SIM/USIM card denoted as 235, and a second SIM/USIM card denoted as 236. The wireless communication device 230 may, for example, include two slots for one SIM card and for one USIM card. The two slots may be compatible with SIM cards and with USIM cards as well. A first slot may couple to a first wireless communication module circuitry that performs wireless receiving and/or transmitting in compliance with at least a first wireless communication technology. A second slot may couple to a second wireless communication module circuitry that performs wireless receiving and/or transmitting in compliance with at least a second wireless communication technology. A SIM card may be, for example, an integrated circuit chip that identifies and authenticates subscribers on a wireless communication device, for example, wireless communication device 230. A SIM card may be used to communicate on GSM networks. It may be also possible to access UMTS with a simple SIM card, however, a USIM card may have many advantages for communicating on UMTS networks. For example, a UMTS handset equipped with a USIM card may be used to make video calls within UMTS network coverage. For example, a USIM card may protect a handset from unauthorized access with a new integrity algorithm for security.

Although not explicitly shown in FIG. 2, in some embodiments, the wireless communication device 230 may, for example, include one slot for a SIM card or a USIM card, for example, SIM/USIM card 235 or 236, and at the same time support a plurality of virtual SIM cards. A virtual SIM card may be a wireless communication device number provided by a network carrier that does not require a physical SIM card to connect phone calls to a user's wireless communication device. With a virtual SIM card, users may have the ability to switch carriers without getting a new card. A virtual SIM card may allow users to choose between different carriers and change services on-the-go, for example, based on service rates. In some embodiments, the wireless communication device 230 may also, for example, not include any slots for physical SIM cards at all, and only support virtual SIM cards. In some embodiments, the wireless communication device 230 may include an embedded SIM that may be remotely provisioned with one or more virtual SIM cards.

As shown in FIG. 2, service center 250 may, for example, include one or more compute-based servers, and databases. The service center 250 may, for example, remotely manage its subscribed users, including obtaining and/or renewing user subscription data. For example, the service center 250 may communicate with the wireless communication device 230 via an interface 255 such as SMS. Other interfaces may be also used, for example, an IP data path. The service center 250 may trigger a number of actions of the wireless communication device 230. The service center 250 may communicate with the network 201 as well for necessary information of communications through an interface 256 such as internet, for example, Transmission Control Protocol/Internet Protocol (TCP/IP). Other interfaces may also apply, for example, SMS. The service center 250 may trigger a number of actions of the network 201, including a plurality of base stations covered by the network 201. The service center 250 may be also known as remote service monitor, or remote service administrator. The service center 250 may be characterized as other apparatuses, for example, IoT device administrator. The service center 250 may be a service company. The service center 250 may also be a network carrier, a medical equipment company, an automobile company, a device manufacturer, or even public facilities, for example, a hospital or a school.

In FIG. 2, a wireless communication device, for example, wireless communication device 230 may be rejected by a network, for example, network 201 during communications.

The rejections may permanently disable a SIM card or a USIM card till the SIM card or the USIM card is switched off, removed and re-inserted. The rejections may also impact certain services, for example, CS or PS services, and disable the services till switch-off, removal and re-insertion of a SIM card or a USIM card is performed. The rejections may happen for a variety of causes. In legacy GSM/UMTS scenarios, also referred to as UTRAN/GERAN, for example, causes for rejections may include International Mobile Subscriber Identity (IMSI) unknown in HLR, Illegal MS, Illegal Mobile Equipment (ME), also referred to as UE without SIM card(s), GPRS services not allowed, or GPRS services and non-GPRS services not allowed over CS, PS, CS and/or PS networks according to 3GPP TS 24.008 version 11.10.0 (2014-03-17). In LTE scenarios, also referred to as EUTRAN, for example, causes for rejections may include IMSI unknown in HSS, Illegal UE, Illegal ME, also referred to as UE without SIM card(s), Evolved Packet Services (EPS) services not allowed, EPS services and non-EPS services not allowed, or CS domain not available over PS networks according to 3GPP TS 24.301 version 11.10.0 (2014-03-17). In these scenarios, the service center 250 may not have any knowledge about as to what causes CS or PS services unavailable for wireless communication devices, for example, wireless communication device 230, and hence, may make the wireless communication device 230 unusable for operations.

In order to regain the CS or PS services in these scenarios, a master may need to be informed about the situations, or direct physical interventions may be needed. For example, a wireless communication device may clear off all variables in a memory, for example, a memory for baseband protocol stack upon receipt of network rejections. A wireless communication device may further disable CS services or PS services, and behave as if the wireless communication device operates on an invalid SIM/USIM card, or the wireless communication device considers itself invalid. Power cycle, or removal and re-insertion of the SIM card on which the wireless communication device operates may be required to get communication services back from the network rejections. Therefore, more efficient ways and means may be desired to regain the CS or PS services quickly for smooth communications. It may be desired that a wireless communication device, for example, wireless communication device 230, may be aware of the network rejections, including current state of CS services or PS services. If, for example, PS services are disabled as per user profiles of the wireless communication device 230, and the wireless communication device 230 is rendered useless, the wireless communication device 230 may be able to trigger a number of actions for correcting. For example, the number of actions for correcting may include switching to a backup SIM/USIM card in case a plurality of SIM/USIM cards are available, and trying to register and to establish communications toward a service center, for example, service center 250 through a backup network. For example, the number of actions for correcting may also include the wireless communication device 230 configured to operate in a CS only mode, and to register to a network to update the service center 250 via an interface 255, for example, interface SMS. Furthermore, the service center 250 may analyze causes of rejections, and accordingly trigger all commands for recovering, for example, resetting the wireless communication device 230, simulating power cycle, or simulating removal and re-insertion of the SIM card that is regarded as invalid.

In some embodiments, a wireless communication device, for example, wireless communication device 230 illustrated by FIG. 2 may include slots for a plurality of SIM/USIM cards. The wireless communication device 230 may include at least one slot for SIM/USIM card, and at the same time, support at least one virtual SIM cards. The wireless communication device 230 may also only support a plurality of virtual SIM cards. At least one of the SIM/USIM cards, or at least one of the virtual SIM cards may be used as a backup SIM card to store information of communication services of the wireless communication device 230. For example, the wireless communication device 230 may have a factory installed universal virtual SIM card that could be used in case of network rejections to provide CS services and further SMS interface to a service center, for example, service center 250.

In some embodiments, the wireless communication device 230 may include subscription applications for storing information of communication services. Or, the wireless communication device 230 may store information of communication services on the wireless communication device 230's memory. Or, the wireless communication device 230 may store information of communication services on a dedicated memory of the wireless communication device 230.

With a backup SIM card, the wireless communication device 230 may switch to the backup SIM card, and then be able to inform the service center 250 through an interface 255 if communication services on a SIM/USIM card 235 or 236, or on a virtual SIM card are rejected. For example, the communication services on the SIM/USIM card 235 or 236 or on the virtual SIM card may be rejected by the network 201 for the reasons as described previously. The interface 255 may be SMS. Other interfaces may be also used, for example, an IP data path. With the information of communication services, the service center 250 may analyze causes of rejections, and accordingly send commands to the wireless communication device 230 through the interface 255, and instruct the wireless communication device 230 to trigger the SIM/USIM card 235 or 236 to refresh, or to perform a reboot. The information of communication services of the wireless communication device 230 may include, for example, wireless communication device identification, PS registration status, causes for rejections received from NetWork IDentity (NWID), also referred to as Public Land Mobile Network (PLMN) ID, or other critical wireless communication device information.

For example, in a GSM/UMTS mode, the wireless communication device 230 may switch back and forth between PS and CS domains, and send an SMS command for stored information of communication services to the service center 250 via the interface 255 if the communication services on a SIM/USIM card 235 or 236, or on a virtual SIM card is down on the PS domain, or on the CS domain. With the information of communication services, the service center 250 may be able to analyze and to acquire knowledge about why the wireless communication device 230 that it administers becomes unusable for communication operations, and may be able to send commands to the wireless communication device 230 for necessary actions, for example, actions for resuming operations.

For example, in a LTE single mode with a backup capability of CS for SMS or Supplementary Services (SS) operation, the wireless communication device 230 may switch to CS domain, and send an SMS command for stored information of communication services to the service center 250 via the interface 255 if the communication services on a SIM/USIM card 235 or 236, or on a virtual SIM card is down. With the information of communication services, the service center 250 may analyze causes of rejections, and accordingly command the wireless communication device 230 to take necessary actions, for example, actions for resumption of communication services. The backup CS capability may remain disabled for operations. This backup CS capability may be one of the requirements for wireless communication devices, for example, wireless communication device 230, in a LTE single mode as a medium for recovering from scenarios of network rejections if the wireless communication device 230 is considered as an IoT device. Particularly, the backup CS capability may be needed when IoT devices are operating in bad terrains such as forest, dam, river or limited accessibility locations.

In some embodiments, the wireless communication device 230 may be able to determine whether LTE RAT is disabled due to higher retries for services on Mobile Network Operator (MNO), or due to other reasons. Scenarios for LTE RAT may include the wireless communication device 230 configured to operate in LTE only mode, classmark configured to be single RAT, or only LTE RAT being enabled. Scenarios for LTE RAT may also include IoT devices operating in PS services mode only. The other reasons may include, for example, network congestion, no responses from networks, lower layer failures, and other failures with respect to protocol stack. According to 3GPP, causes for rejections from networks may include Illegal UE, Illegal ME, EPS services not allowed, and EPS services and non-EPS services not allowed. The rejections from networks may render the wireless communication device 230 useless, and the wireless communication device 230 may consider local SIM/USIM card, for example, SIM/USIM card 235 or 236, as invalid. When such situation happens, only power cycle, SIM/USIM card removal and SIM/USIM card re-insertion may re-activate the SIM/USIM card 235 or 236. Moreover, messages for rejections may be generated or sent without integrity protection, and hence, any rogue networks may cause Denial of Service to any wireless communication devices, or any IoT devices by sending fake messages for rejections.

Once the wireless communication device 230 determines disablement of LTE RAT, the wireless communication device 230 may trigger SIM/USIM card switch in an event of a multi-SIM scenario, or enable CS domain for communication services on available GSM/UMTS networks. For example, the wireless communication device 230 may switch to another SIM/USIM card, and communicate with a service center, for example, service center 250, about current PS status.

In some embodiments, protocol stack may detect that PS services are disabled, and the protocol stack may trigger messages toward Operations and Maintenance layer (OM), or part of the protocol stack may trigger RAT switch to a legacy network. Cellular protocol stack may consist of various layers, for example, physical layer 1, physical layer 2, physical layer 3, and application layer. The OM layer may be part of the application layer that is above the layer 3. The layer 3 may be a Non-Access Stratum (NAS) layer that interacts with a core network, for example, Mobility Management Entity (MME) in LTE network. Once the wireless communication device 230 is registered on a legacy network, for example, CS network, the wireless communication device 230 may be able to communicate with the service center 250, and to update the service center 250 on present status of PS services of the wireless communication device 230, and hence, be also able to act accordingly in response to commands from the service center 250 via an interface, for example, via SMS.

In some embodiments, the wireless communication device 230 may take corrective actions, for example, IMSI Switch. An IMSI switch may be a mechanism where another backup subscription may be active. For example, whenever communication services are unavailable as a result of rejection from a network, for example, network 201, on a primary IMSI, the mechanism may switch to a backup IMSI in order to get the communication services back. For example, a SIM application toolkit may trigger the IMSI switch upon a baseband modem of the wireless communication device 230 indicating that a current status of CS or PS services are unavailable, or rejected by the network 201.

If, for example, a wireless communication device is configured as an IoT device and to operate in CS/PS Mode I/II, the IoT device may try to register on legacy networks so to communicate with a service center and to provide updates on PS status upon receiving network rejections for a variety of causes. In case that both CS services and PS services are rejected, the IoT device may not invalidate local SIM/USIM card, instead, the IoT device may trigger fresh registration attempt toward a network by setting Ciphering Key Sequence Number (CKSN) as invalid so that the network may be prompted to trigger fresh authentication.

In some embodiments, with the information of communication services, the service center 250 may analyze causes of rejections, and communicate with the communication device 230 through the interface 255 for necessary actions to get the SIM/USIM card 235 or 236, or the virtual SIM card to work again. The communications with the communication device 230 may include modifying profiles of the SIM/USIM card 235 or 236, or the virtual SIM card to match the network 201. The communications may also include, for example, resetting all the counters, deleting all network elements, resetting important information, for example, Elementary Files (EF) that are presented on SIM cards, and rebooting the communication device 230 to trigger fresh registration toward the network 201. The communications may further include resetting a memory of the wireless communication device 230, for example, a baseband protocol stack memory of the wireless communication device 230. The resetting of a baseband protocol stack memory may bring all variables to original states, and clear up all lists and/or counters that are maintained in the protocol stack. The wireless communication device 230 may power up as if powered up for the first time. In some embodiments, the service center 250 may instruct the wireless communication device 230 to clear up part of a baseband protocol stack memory, including part of lists and/or counters maintained in the protocol stack via SMS in order to get the wireless communication device 230 back on communication services. In some embodiments, the service center 250 may instruct the wireless communication device 230 to reset local SIM/USIM card that operates on communication services, for example, to reset a subscriber information module, or to reset an error code. In some embodiments, the service center 250 may consider the wireless communication device 230 as reset.

In some embodiments, the service center 250 may analyze causes for rejections once receiving the information of communication services, for example, via SMS. Based on results of the analysis, the service center 250 may compose actions for resolutions, for example, SIM/USIM card reset, subscriber information module reset, or error code reset, etc. Based on the results of the analysis, the service center 250 may compose actions to resolve issues caused by other reasons.

In some embodiments, based on the results of the analysis, the service center 250 may communicate with networks, for example, network 201 in case of service provision issues through an interface, for example, interface 256. The interface 256 may be a web-based interface such as internet, for example, TCP/IP or other secure interfaces provided by the network 201. Other interfaces may be also used. For example, the service center 250 may communicate with the network 201 for resolving subscription managements. For example, the service center 250 may also analyze solutions responded from the network 201.

In some embodiments, communications between the service center 250 and the network 201 may include negotiating for changes to the network 201 so that the radio network 201 may adapt to the SIM/USIM card 235 or 236, or the virtual SIM card. The adaptations may include renew subscriptions at the network 201 end, including updating HLR with details of the wireless communication device 230, or resetting a database of the network 201 after recovery from certain failures so that further attempts of the wireless communication device 230 for registration may be accepted. The communications between the service center 250 and the network 201 may also include, for example, querying about subscription status of the communication device 230 that is down, checking and renewing subscription data, and updating information on the network 201 side about a certain subscriber. The communications between the service center 250 and the network 201 may further include, for example, instructing the operator for the network 201 to trigger Over The Air (OTA) updates, for example, SIM refresh with new parameters, etc.

In some embodiments, with the information of communication services, the service center 250 may communicate with the wireless communication device 230 through the interface 255, and accordingly, with the network 201 as well through the interface 256. The communications with the wireless communication device 230 and the network 201 may include making compromises from the both sides, for example, modifications to the profiles of the SIM/USIM card 235 or 236, or to the profiles of the virtual SIM card in order to match the network 201, and changes to the network 201 so that the network 201 adapts to the SIM/USIM card 235 or 236, or to the virtual SIM card. The communications may also include, for example, OTA updates, subscription renewals, etc.

In some embodiments, profiles of wireless communication devices may be, for example, profiles of the SIM/USIM card 235 or 236, or profiles of the virtual SIM card of the wireless communication device 230. The profiles may be also software configurations that may represent working conditions for the wireless communication device. For example, software on a modem of the wireless communication device may be configured by applying the profiles, for example, the wireless communication device operating on a CS mode, a PS mode, or a CS and/or PS mode, or the wireless communication device operating as an IoT device, etc. The profiles may be defined through protocol stacks at a time of production of wireless communication devices. The profiles may be changed through programming during the production of wireless communication device, or after the production of wireless communication devices. For example, the profiles may be changed for distributing new software, configuring settings, and even updating encryption keys through programming over an air interface. The profiles may be also changed through SIM cards that are located in wireless communication devices, for example, through the SIM/USIM card 235 or 236, or the virtual SIM card of the wireless communication device 230. The changes made through SIM cards may directly or indirectly come from network carriers.

In some embodiments, profiles of wireless communication devices, for example, wireless communication device 230, may be stored at services centers, for example, service center 250, when connections between the wireless communication device 230 and the service center 250 via the interface 255 are established for the first time. The profiles of the wireless communication device 230 stored at the service center 250 may be updated over the time during the connections between the wireless communication device 230 and the service center 250 via the interface 255. The profiles of the wireless communication device 230 may be stored at the service center 250 when connections between the service center 250 and the network 201 via the interface 256 are established for the first time. The profiles of the wireless communication device 230 stored at the service center 250 may be updated over the time during the connections between the service center 250 and the network 201 via the interface 256. The profiles of the wireless communication device 230 may be stored and/or updated directly at the service center 250, for example, at a local server or a local memory of the service center 250. Other ways and means for restoring and/or updating profiles of wireless communication devices may also apply.

In some embodiments, the wireless communication device 230 may report to the service center 250 on status of communication services via a CS or PS channel after regaining the communication services. The regain of the communication services may be result of analysis of service center 250, and/or results of compromises made between the service center 250 and the network 201.

Figure 3:
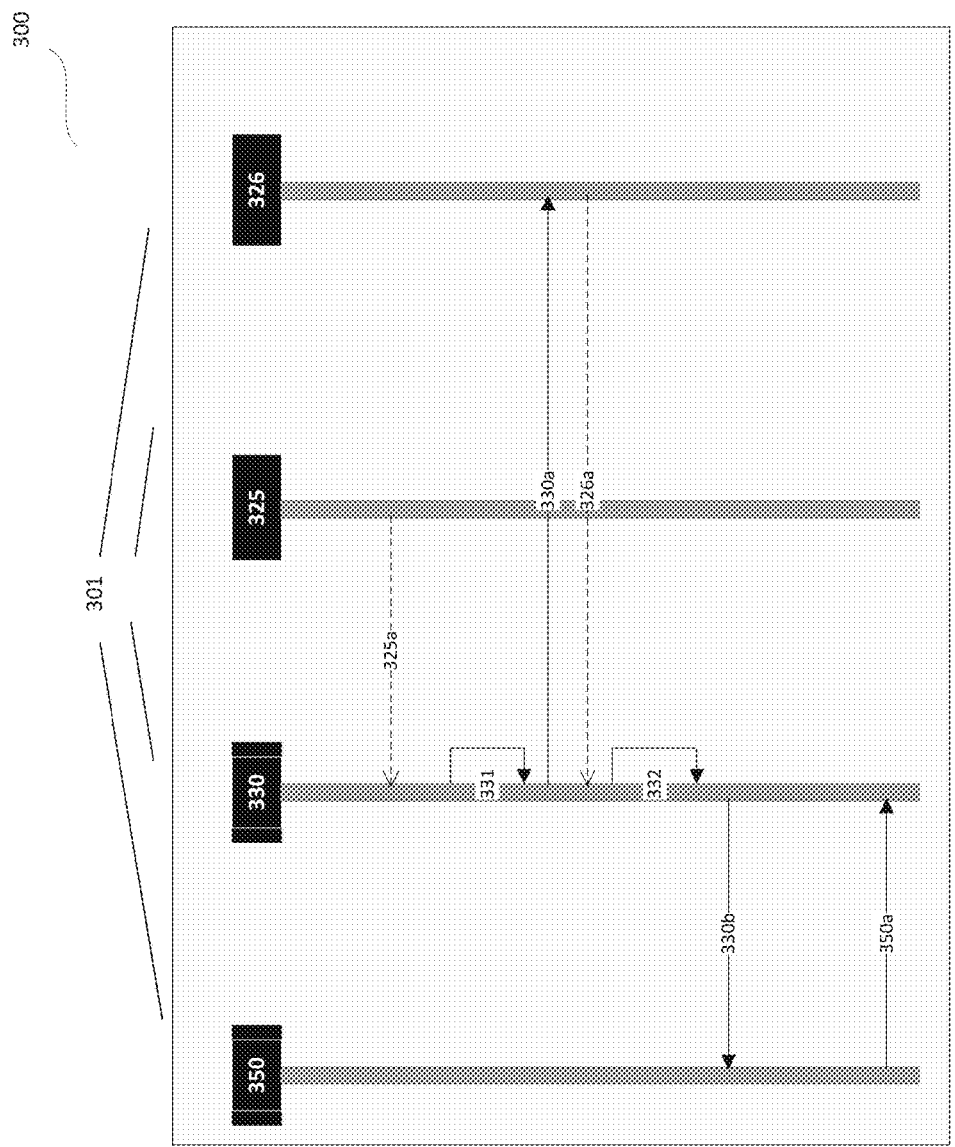
FIG. 3 shows an example recovery from rejections of networks in accordance with some embodiments.

FIG. 3 shows an example recovery from rejections of networks in accordance with some embodiments. A wireless communication device, for example, wireless communication device 330 may be configured to operate in LTE single mode only. In some embodiments, the wireless communication device 330 may include a first slot for a first SIM/USIM card, and a second slot for a second SIM/USIM card. The first slot may couple to a first communication module circuitry that performs wireless receiving and/or transmitting in compliance with at least a first wireless communication technology, and communicatively couples the wireless communication device 330 with a first network. The second slot may couple to a second communication module circuitry that performs wireless receiving and/or transmitting in compliance with at least a second wireless communication technology, and communicatively couples the wireless communication device 330 with a second network. In some embodiments, the wireless communication device 330 may support a plurality of virtual SIM cards, for example, a first virtual SIM card, a second virtual SIM card, etc. The first SIM/USIM card, or the first virtual SIM card may perform all necessary functions for the communication services. For example, information of the communication services may be stored on a second SIM/USIM card if the wireless communication device 330 includes slots for a plurality of SIM/USIM cards. For example, information of the communication services may be stored on a virtual SIM card if the wireless communication device 330 supports virtual SIM. For example, information of the communication services may be stored on a second virtual SIM card if the wireless communication device 330 only supports a plurality of virtual SIM cards. For example, information of the communication services may be stored on the wireless communication device 330's memory, or on a second memory of the wireless communication device 330 that is dedicated for the information of the communication services.

During normal operations, the wireless communication device 330 may be rejected from a network that provides radio access coverage, for example, network 301. In some embodiments, a PS network 325 may send a reject message 325a to the wireless communication device 330. The reject message 325a may include reasons for rejections such as those included in 3GPP TS 24.008 version 11.10.0 (2014-03-17) and/or in 3GPP TS 24.301 version 11.10.0 (2014-03-17). The PS network 325 may, for example, provide the PS network services to the wireless communication device 330 in LTE single mode, and the wireless communication device 330 may be made in a dysfunctional state 331 if the PS network 325 rejects provision of the PS network services. A service center, also known as remote service monitor or remote service administrator, for example, service center 350 that remotely administers the wireless communication device 330 may not have any idea about the rejection of the PS network 325, nor an up-to-date situation of the wireless communication device 330 until the wireless communication device 330 switches from the disabled PS network services to backup CS network services provided by, for example, CS network 326. The switch may include triggering a switch to a second SIM/USIM card, to a virtual SIM card, or to a second virtual SIM card to use the CS network services 326. In some embodiments, a second SIM/USIM card may send a register request, for example, register request 330a to the CS network 326, and further may receive a registration accept message, for example, register accept message 326a from the CS network 326. In some embodiments, the switch may also include triggering a switch to RAT mode, and use the CS network services. Procedures for a RAT change may be triggered by the OM layer of the protocol stack that is on the top of the NAS layer.

In this way, the wireless communication device 330 may be able to register for CS network services with the CS network 326, and be in a CS-registered state, for example, CS-registered state 332. In the CS-registered state 332, the wireless communication device 330 may be able to communicate with the service center 350 even though the communication services provided by the PS network services 325 are disabled. For example, the second SIM/USIM card, the virtual SIM card, or the second virtual SIM card of the wireless communication device 330 may utilize CS services to communicate back and forth with the service center 350 via an interface such as SMS. For example, the wireless communication device 330 may be able to send a message, for example, message 330b to deliver information of disabled PS network services to the service center 350, and the service center 350 may analyze causes of rejections, and accordingly send a command, for example, command 350a, to the wireless communication device 330 for resumption of the PS network services. In some embodiments, the service center 350 may respond to command the wireless communication device 330 to reset the first SIM/USIM card, or reset the first virtual SIM card. In some embodiments, the service center 350 may use SMS to send a recovery command to the wireless communication device 330. In some embodiments, the service center 350 may use a Dual Tone Multi Frequency (DTMF) signaling to send a recovery command to the wireless communication device 330. A DTMF may be a signal to device companies that is generated through pressing touch keys of an ordinary device. A DTMF may generally replace loop disconnect, also referred to as pulse, dialing. With a DTMF, each key or each touch key on a device may be able to generate two tones for specific frequencies if pressed. Human voices may not be able to imitate the tones. For example, one tone may be generated from a high frequency group of tones, and the other tone may be generated from a low frequency group. The service center may use a DTMF signaling, and instruct the wireless communication device 330 to reset so the wireless communication device 330 may be brought back to communication services.

In some embodiments, the wireless communication device 330 may use the CS network services to call back the service center 350 to report how the commands proceed, or to report any issues in proceeding with the commands.

In some embodiments, once the wireless communication device 330 is back on the communication services, the wireless communication device 330 may use either CS network services or PS network services to communicate to the service center 350 and update the service center 350 on status of the communication services.

In some embodiments, the service center 350 may communicate with networks, for example, network 301 through an interface such as internet to check whether any changes or adaptations may be made to the network 301 for the first SIM/USIM card, or for the first virtual SIM card that operates on the network 301 for the communication services.

In some embodiments, the service center 350 may communicate with the wireless communication device 330, and accordingly, with the network 301 as well to reach out compromises from the both sides in order to get the first SIM/USIM card, or the first virtual SIM card that operates on the network services back to the communication services.

Methods, devices, and systems for recovering network rejections to wireless communication devices such as mobile phones, smart phones, portable devices, or IoT devices may exhibit a number of features. A first principle may include a wireless communication device storing information of communication services provided by a first network. A second principle may include a wireless communication device using a second network service, and sending the information of communication services to a service center when the communication services are rejected by the first network. A third principle may include a service center communicating with a wireless communication device through the second network service and communicating with the first network for resumption of the communication services by the wireless communication device.

Methods, devices, and systems for recovering network rejections to wireless communication devices such as mobile phones, smart phones, portable devices, or IoT devices may also apply Components of the wireless communication device, for example, transmitter, receiver, transceiver, processor, memory, antennas, and wired connections may for example be implemented by one or more circuitries.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 4:
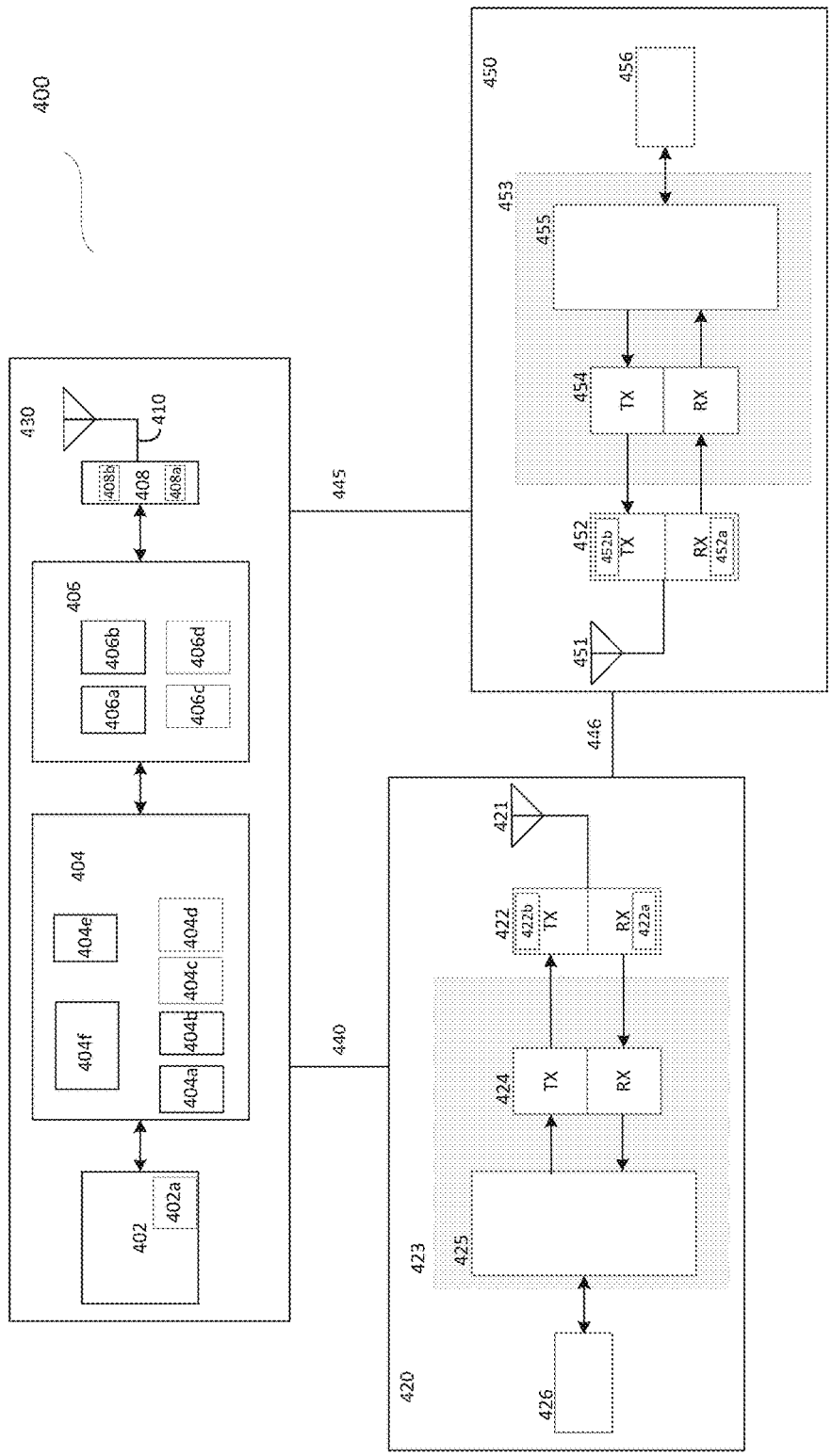
FIG. 4 shows an exemplary wireless communication device communicating with an exemplary service center, and with an exemplary base station of a mobile radio cell of a wireless communication system in accordance with some embodiments.

Embodiments described herein may be implemented into a system using any suitably configured hardware and/or software. FIG. 4 illustrates, for one embodiment 400, example components of a wireless communication device 430, example components of a service center 450, and example components of a base station 420 for a mobile radio cell of a wireless communication system.

In some embodiments, the wireless communication device 430 may include application circuitry 402, baseband circuitry 404, Radio Frequency (RF) circuitry 406, Front-End Module (FEM) circuitry 408 and one or more antennas 410, coupled together at least as shown.

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The application circuitry 402 may include one or more memories, for example, memory 402a for storing communication services on which the wireless communication device 430 operates. The memory 402a may also store, for example, information of wireless communication device identification, PS or CS registration status, causes of rejections received from NW ID, also referred to as PLMN ID, or other critical wireless communication device information, etc.

The baseband circuitry 404 may include circuitry such as, but not limited to, one or more single-core or multi-core processors. The baseband circuitry 404 may include one or more baseband processors and/or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a second generation (2G) baseband processor 404a, third generation (3G) baseband processor 404b, fourth generation (4G) baseband processor 404c, and/or other baseband processor(s) 404d for other existing generations, generations in development or to be developed in the future (e.g., fifth generation (5G), 6G, etc.). The baseband circuitry 404 (e.g., one or more of baseband processors 404a-d)may handle various radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, and/or constellation mapping/demapping functionality. In some embodiments, encoding/decoding circuitry of the baseband circuitry 404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include elements of a protocol stack such as, for example, elements of an Evolved Universal Terrestrial Radio Access Network (EUTRAN) protocol including, for example, physical (PHY), Media Access Control (MAC), Radio Link Control (RLC), Packet Data Convergence Protocol (PDCP), and/or Radio Resource Control (RRC) elements. A Central Processing Unit (CPU) 404e of the baseband circuitry 404 may be configured to run elements of the protocol stack for signaling of the PHY, MAC, RLC, PDCP and/or RRC layers. In some embodiments, the baseband circuitry may include one or more audio Digital Signal Processor(s) (DSP) 404f. The audio DSP(s) 404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a System on a Chip (SoC).

In some embodiments, the CPU 404e may be configured to manage the radio communication functionality of the wireless communication device 430 in order to communicate with the various radio access and core network components of radio communication networks, and accordingly may be configured according to the communication protocols for both the LTE network and the GSM/UMTS legacy network. The CPU 404e may either be a unified controller that is collectively responsible for all supported radio access technologies (e.g. LTE and GSM/UMTS) or may be composed of multiple separate controllers where each controller is a dedicated controller for a particular radio access technology, such as e.g. a dedicated LTE controller and a dedicated legacy controller (or alternatively a dedicated LTE controller, dedicated GSM controller, and a dedicated UMTS controller). Regardless, the CPU 404e may be responsible for directing radio communication activity of the wireless communication device 430 according to the communication protocols of the LTE and legacy networks. Depending on the specifics of each such configuration and the number of supported radio access technologies, the CPU 404e may be configured to control the radio communication operations of the wireless communication device 430 in accordance with a master/slave RAT hierarchical or multi-SIM scheme.

In some embodiments, CPU 404e may also be referred to as a processor. The processor 404e may, for example, handle rejections from networks for the causes that are defined by 3GPP when communication services are disabled and local SIM/USIM that operates on the communication services are regarded as invalid. The processor 404e may, for example, determine procedures for RAT change that is triggered by OM layer of the protocol stack sitting on top of NAS layer. The processor 404e may, for example, determine procedures for service change, for example, change from PS network services to CS network services. The processor 404e may further process radio signals received from the service center 450 via an interface, for example, interface 445, or from the base station 420 via channel, for example, channel 440.

In some embodiments, the baseband circuitry 404 may provide for communication compatible with one or more radio technologies. For example, in some embodiments, the baseband circuitry 404 may support communication with an Evolved Universal Terrestrial Radio Access Network (EUTRAN) and/or other Wireless Metropolitan Area Networks (WMAN), a Wireless Local Area Network (WLAN), a Wireless Personal Area Network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the RF circuitry 406 may include a receive signal path and a transmit signal path. The receive signal path of the RF circuitry 406 may include mixer circuitry 406a, amplifier circuitry 406b and filter circuitry 406c. The transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a Low-Pass Filter (LPF) or Band-Pass Filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect.

In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c. The filter circuitry 406c may include a Low-Pass Filter (LPF), although the scope of the embodiments is not limited in this respect.

In some embodiments, the mixer circuitry 406a of the receive signal path and the mixer circuitry 406a of the transmit signal path may include two or more mixers and may be arranged for quadrature downconversion and/or upconversion respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and/or direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include Analog-to-Digital Converter (ADC) and Digital-to-Analog Converter (DAC) circuitry and the baseband circuitry 404 may include a digital baseband interface to communicate with the RF circuitry 406.

In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider.

The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer.

In some embodiments, frequency input may be provided by a Voltage Controlled Oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a Delay-Locked Loop (DLL), a multiplexer and a phase accumulator. In some embodiments, the divider may be a Dual Modulus Divider (DMD) and the phase accumulator may be a Digital Phase Accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410.

In some embodiments, the FEM circuitry 408 may include a TX/RX switch to switch between transmit mode and receive mode operation. The FEM circuitry may include a receive signal path and a transmit signal path. The receive signal path of the FEM circuitry may include a Low-Noise Amplifier (LNA) to amplify received RF signals and provide the amplified received RF signals as an output (e.g., to the RF circuitry 406). The transmit signal path of the FEM circuitry 408 may include a Power Amplifier (PA) to amplify input RF signals (e.g., provided by RF circuitry 406), and one or more filters to generate RF signals for subsequent transmission (e.g., by one or more of the one or more antennas 410).

In some embodiments, the FEM circuitry 408 may include one or more receivers, for example, receiver 408*a* for receiving radio signals and/or data such as phone call signals, video data, or updated profiles of the wireless communication device 230 through programming over the air. The FEM circuitry 408 may also include one or more transmitters, for example, transmitter 408*b* for transmitting radio signals to one or more networks through a plurality of base stations, for example, base station 420 via channel 440, or transmitting radio signals to service centers, for example, service center 450 that administers the wireless communication device 430 via interface 445.

In some embodiments, although not explicitly depicted in FIG. 4, the wireless communication device 430 may include slots for a plurality of SIM/USIM cards, for example, may include a first slot for a first SIM/USIM card, and a second slot for a second SIM/USIM card. A first slot may couple to a first wireless communication module circuitry that performs wireless receiving and/or transmitting in compliance with at least a first wireless communication technology, and communicatively couples the wireless communication device 430 with a first network. A second slot may couple to a second wireless communication module circuitry that performs wireless receiving and/or transmitting in compliance with at least a second wireless communication technology, and communicatively couples the wireless communication device 430 with a second network.

In some embodiments, the wireless communication device 430 may include additional elements such as, for example, memory/storage, display, camera, sensor, and/or Input/Output (I/O) interface which may allow a user of the wireless communication device 430 to control various communication functions of the wireless communication device 430 associated with user data. For example, memory/storage may be a hard drive or another such permanent memory device. Although not explicitly depicted in FIG. 4, the various other components of the wireless communication device 430 shown in FIG. 4 may additionally each include integrated permanent and non-permanent memory components, such as for storing software program code, buffering data, etc.

In some embodiments, the service center 450 may include a plurality of antennas, or a plurality of antenna arrays, for example, antenna 451. The service center 450 may include one or more receivers, for example, receiver 452*a* for receiving radio signals, for example, signals for commands from the wireless communication device 430, including signals for information of communication services via an interface, for example, interface 445. In some embodiments, the service center 450 may include one or more transmitters, for example, transmitter 452*b* for transmitting radio signals for commands to the wireless communication device 430 via the interface 445, or to the base station 420 of a mobile radio cell of a wireless communication system via an interface, for example, interface 446. The service center 450 may include one or more RF circuitries, for example, RF circuitry 454 for a receive signal path and a transmit signal path. The service center 450 may further include one or more baseband modems, for example, baseband modem 453 to direct communication functionality of the service center 450 according to communication protocols associated with each network, to execute control over the plurality of antennas, or the plurality of antenna arrays, for example, antenna 451, and control of the one or more receivers, for example, receiver 452*a*, or the one or more transmitters, for example, transmitter 452*b*. The service center 450 may include one or more processers, for example, processor 455 run a real time operating system for a server. A server may be a simple computer with capabilities of sending multiple SMSs to a plurality of wireless communication devices, and/or receiving multiple SMSs from a plurality of wireless communication devices. In some embodiments, the processor 455 may run a real time operating system for a database where critical device information is stored. In some embodiments, the processor 455 may also analyze causes for rejections from networks based on information received from the wireless communication device 430 via the interface 445. In some embodiments, the processor 455 may further analyze solutions for rejections from networks based on information received from the base station 420 of a mobile radio cell of a wireless communication system via the interface 446. In some embodiments, the service center may include one or more memories, for example, memory 456 for storing, for example, the information of communication services, or information of subscription, etc. The memory 456 may further store causes of rejections from network, or information of communication services received by the wireless communication device 430 for future use.

As described, the service center 450 may have a TCP/IP web interface, for example, interface 446 to network infrastructure, for example, base station 420 of a network for a plurality of wireless communication devices that are administered by the service center 450.

In some embodiments, the base station 420 of a mobile radio cell of a wireless communication system may include a plurality of antennas, or a plurality of antenna arrays, for example, antenna 421. The base station may include one or more receivers, for example, receiver 422*a* for receiving radio signals, for example, from the service center 450 via the interface 446, or from the wireless communication device 430 via channel, for example, channel 440. In some embodiments, the base station 420 may include one or more transmitters, for example, transmitter 422*b* for transmitting radio signals for commands, for example, to the service center 450 via the interface 446, or to the wireless communication device 430 via the channel 440. The base station 420 may include one or more RF circuitries, for example, RF circuitry 424 for a receive signal path and a transmit signal path. The base station 420 may further include one or more baseband modems, for example, baseband modem 423 to direct communication functionality of the base station 420 according to communication protocols associated with each network, to execute control over the plurality of antennas, or the plurality of antenna arrays, for example, antenna 421, and control of the one or more receivers, for example, receiver 422*a*, or the one or more transmitters, for example, transmitter 422b. In some embodiments, the base station 420 may include one or more processors, for example, processor 425 for processing the radio signals received. For example, the processor 425 may determine how to compromise, or how to negotiate with the service center 450 in order to get the wireless communication device 430 back on communication services when the communication services are rejected by a network. In some embodiments, the base station 420 may include one or more memories, for example, memory 426 for storing information such as identification of network subscribers, causes of rejections reported by the wireless communication device 430 via channel 440 and by the service center 450 via interface 446, etc.

As illustrated by FIG. 2, a wireless communication device 230 with slots for a plurality of SIM cards, for example, with slots for a first SIM card 250 and a second SIM card 260, locates in a mobile radio cell 210 for which a base station 220 provides radio coverage. The wireless communication device 230 may be a UE, a mobile device, a receiver, a transmitter, a transceiver or a MS. The mobile radio cell 210 is one of the mobile radio cells of a wireless communication system, for example, wireless communication system 100 illustrated by FIG. 1. The wireless communication system 100 may apply GSM, EDGE, UMTS, LTE, or 5G communication standards. As described, the wireless communication device 230 with slots for two SIM cards 250 and 260 may connect a one and the same base station 220. For example, the two SIM cards 250 and 260 may connect to a one and the same operator. For example, the wireless communication device 230 may be roaming, and even though the two SIM cards 250 and 260 have different Home PLMN, they may have the same VPLMN. For example, the operator for the two SIM cards 250 and 260 may share the same base station, for example, base station 220.

Figure 5:
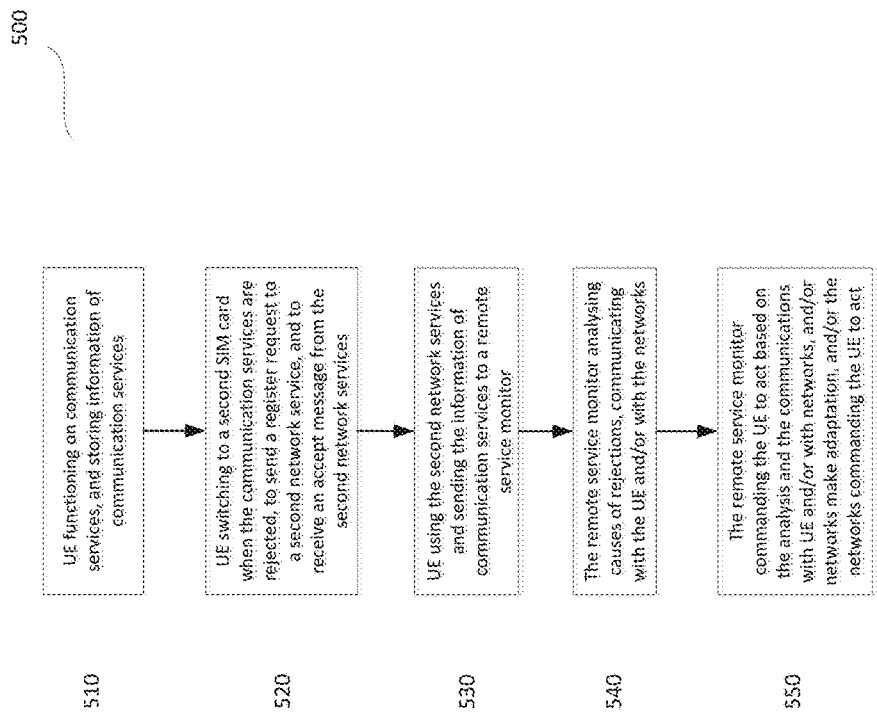
FIG. 5 shows a flow diagram illustrating an example method for recovering from network rejections in accordance with some embodiments.

FIG. 5 shows a flow diagram 500 depicting an example method for recovering network rejections to wireless communication devices.

In 510, a wireless communication device, for example, wireless communication device 230 communicates with wireless communication systems, for example, wireless communication system 205 and/or 206 covered by a network, for example, network 201, as illustrated by FIG. 2. The wireless communication device 230 communicates with a remote service monitor as well, for example, remote service monitor 250. The remote service monitor 250 independently communicates with the network 201, including the wireless communication system 205 and/or 206. The network 201 may be, for example, UTRAN and/or GERAN. The network 201 may be also, for example, an E-UTRAN. The wireless communication systems 205 and 206 may apply GSM, EDGE, UMTS, LTE, or 5G. The wireless communication device 230 stores information of communication services of a first SIM/USIM card that is located within the wireless communication device 230, or of a first virtual SIM card that is supported by the wireless communication device 230. Information of communication services may be stored on a second SIM/USIM card that is located within the wireless communication device 230. Information of communication services may be stored on a virtual SIM card in an event that a first SIM/USIM card operates on communication services, or on a second virtual SIM card that is supported by the wireless communication device 230. Information of communication services may be stored on the wireless communication device 230's memory. Information of communication services may be stored on a memory of the wireless communication device 230 that is dedicated for the information of the communication services. Information of communication services may be updated over the time of communications. For example, in a dual-SIM scenario, a user may switch between the two SIM for different network carriers.

In 520, the wireless communication device 230 may use a second network to communicate with the remote service monitor 250 when the communication services for a first SIM/USIM card, or for a first virtual SIM card are rejected by a first network. For example, the wireless communication device 230 may switch to a second SIM/USIM card, or a virtual SIM card in order to send a register request to the second network. The wireless communication device 230 may further receive a registration accept message from the second network so that the wireless communication device 230 may use the second network services to communicate with the remote service monitor 250. For example, the wireless communication device 230 may send the stored information of communication services to the remote service monitor 250.

In 530, the wireless communication device 230 may use the second network services, for example, CS network services if the wireless communication device 230 operates in a LTE single mode, and send the information of communication services to the remote service monitor 250 via an interface 255 illustrated by FIG. 2, for example, an SMS.

In 540, with the information of communication services, the remote service monitor 250 may analyze causes of rejections, and compose necessary actions for resumption of the wireless communication device 230. Based on the analysis, the remote service monitor 250 may communicate with the wireless communication device 230 via the interface 255 to modify profiles of a first SIM/USIM card or a first virtual SIM card for communication services. With the information of communication services, the remote service monitor 250 may communicate with the network 201 via an interface 256 illustrated by FIG. 2, for example, via internet, for suggestions of changes to the network 201. With the information of communication services, the remote service monitor 250 may communicate with the wireless communication device 230 via the interface 255, and accordingly, with the network 201 via the interface 256 for compromises from both sides in order to get the wireless communication device 230 back to communication services. Profiles of SIM/USIM cards, or profiles of virtual SIM cards may be stored at the time of production, and maybe updated through programming over an air interface. Profiles of SIM/USIM cards, or profiles of virtual SIM cards may be stored or updated by network carriers. Profiles of SIM/USIM cards, or profiles of virtual SIM cards may be stored or updated directly on a local server, or a local memory of the remote service monitor 250.

In 550, the remote service monitor 250 may send a command to the wireless communication device 230 to reset or reconfigure a first SIM/USIM card, or a first virtual SIM/USIM card, or to modify profiles of a first SIM/USIM card, or a first virtual SIM/USIM card. The remote service monitor 250 may communicate with the network 201, and the network 201 may make changes in order to adapt to a first SIM/USIM card, or a first virtual SIM/USIM card. The remote service monitor 250 and the network 201 may reach out compromises so that the remote service monitor 250 may command the wireless communication device 230 to take necessary actions, and the network 201 may make necessary changes to accommodate the actions taken by the wireless communication device 230. In addition, the network 201 may command the wireless communication device 230 to reset, to reconfigure a first SIM/USIM card, or a first virtual SIM/USIM card, or to modify profiles of a first SIM/USIM card, or a first virtual SIM/USIM card.

Figure 6:
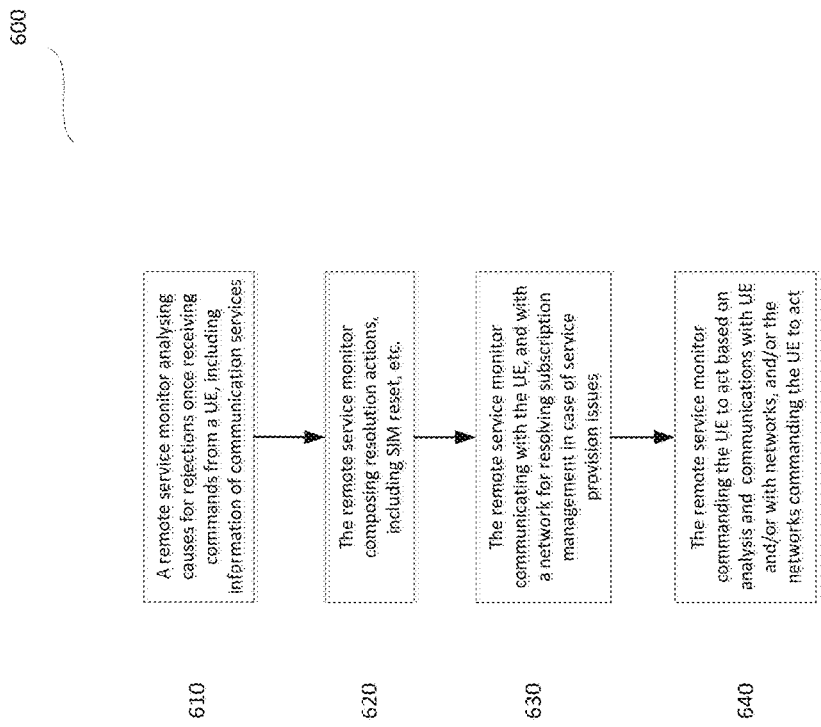
FIG. 6 shows a flow diagram illustrating a second example method for recovering from network rejections in accordance with some embodiments.

FIG. 6 shows a flow diagram 600 depicting a second example method for recovering network rejections to wireless communication devices.

In 610, a remote service monitor, for example, remote service monitor 250 may administer a wireless communication device, for example, wireless communication device 230 of wireless communication systems, for example, wireless communication system 205 and/or 206 covered by a network, for example, network 201, as illustrated by FIG. 2. The remote service monitor 250 may independently communicate with the network 201, including the wireless communication system 205 and/or 206. The network 201 may be, for example, UTRAN and/or GERAN. The network 201 may be also, for example, an E-UTRAN. The wireless communication systems 205 and 206 may apply GSM, EDGE, UMTS, LTE, or 5G. The remote service monitor 250 may analyze causes of rejection from the network 201 based on information sent by the wireless communication device 230 that it administer. The information may include commands from the wireless communication device 230. The information may also include information regarding communication services on which the wireless communication device 230 operates.

In 620, the remote service monitor 250 may compose actions for resolutions, for example, SIM/USIM card reset, subscriber information module reset, error code reset, or other actions for resolving issues caused by other reasons. The actions for resolutions may also include resolving subscription management with the network 201 that rejects the communication services for the wireless communication device 230 if causes of rejection are due to service provision issues.

In 630, the remote service monitor 250 may communicate with the network 201 via an interface 256 illustrated by FIG. 2, for example, via internet, for resolving subscription management. The remote service monitor 250 may further analyze solutions responded from the network 201.

In 640, the remote service monitor 250 may command the wireless communication device 230 to reset or reconfigure a first SIM/USIM card, or a first virtual SIM/USIM card, or to modify profiles of a first SIM/USIM card, or a first virtual SIM/USIM card that is either located within the wireless communication device 230 or supported by the wireless communication device 230. The remote service monitor 250 may communicate with the network 201, and the network 201 may make changes in order to adapt to a first SIM/USIM card, or a first virtual SIM/USIM card. The remote service monitor 250 and the network 201 may reach out compromises so that the remote service monitor 250 may command the wireless communication device 230 to take necessary actions, and the network 201 may make necessary changes to accommodate the actions taken by the wireless communication device 230. In addition, the network 201 may command the wireless communication device 230 to reset, to reconfigure a first SIM/USIM card, or a first virtual SIM/USIM card, or to modify profiles of a first SIM/USIM card, or a first virtual SIM/USIM card.

Figure 7:
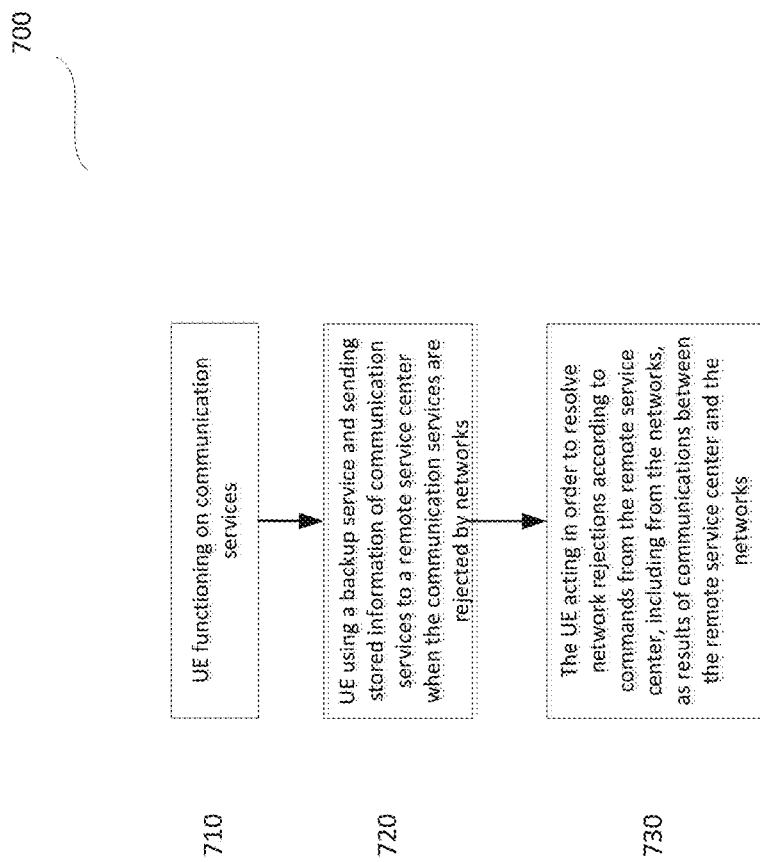
FIG. 7 shows a flow diagram illustrating a third example method for recovering from network rejections in accordance with some embodiments.

FIG. 7 shows a flow diagram 700 depicting a third example method for recovering network rejections to wireless communication devices.

In 710, a wireless communication device, for example, wireless communication device 230 communicates with wireless communication systems, for example, wireless communication system 205 and/or 206 covered by a network, for example, network 201, as illustrated by FIG. 2. The wireless communication device 230 communicates with a service center as well, for example, service center 250. The service center 250 independently communicates with the network 201, including the wireless communication system 205 and/or 206. The network 201 may be, for example, UTRAN and/or GERAN. The network 201 may be also, for example, an E-UTRAN. The wireless communication systems 205 and 206 may apply GSM, EDGE, UMTS, LTE, or 5G.

In 720, the wireless communication device 230 may use a backup service, and send stored communication services to the service center 250 when the communication service on a first SIM/USIM card, or on a first virtual SIM card is rejected by a network. For example, in a LTE single mode, the wireless communication device 230 may use a backup CS service, and send the stored communication services to the service center 250 when the communication service on a first SIM/USIM card, or on a first virtual SIM card is rejected by a PS network. The wireless communication device 230 may send the stored communication services via an interface 255 illustrated by FIG. 2, for example, an SMS.

In 730, the wireless communication device 230 may act in response to commands sent by the service center 250 via the interface 255. For example, the wireless communication device 230 may modify profiles of a first SIM/USIM card or a first virtual SIM card that is either located in the wireless communication device 230 or supported by the wireless communication device 230 for resumption of communication services. Profiles of SIM/USIM cards, or profiles of virtual SIM cards may be stored at the time of production, and maybe updated through programming over an air interface. Profiles of SIM/USIM cards, or profiles of virtual SIM cards may be stored or updated by network carriers. Profiles of SIM/USIM cards, or profiles of virtual SIM cards may be stored or updated directly on a local server, or a local memory of the service center 250. For example, the wireless communication device 230 may reset or reconfigure the first SIM/USIM card, or the first virtual SIM/USIM card according to the commands of the service center 250. The commands of the service center 250 may be outcomes of communications between the service center 250 and the network 201. For example, the service center 250 and the network 201 may reach out compromises so that the service center 250 may command the wireless communication device 230 to take actions, and the network 201 may make changes to accommodate the actions taken by the wireless communication device 230. In addition, the wireless communication device 230 may reset, reconfigure the first SIM/USIM card, or the first virtual SIM/USIM card, or to modify profiles of the first SIM/USIM card, or the first virtual SIM/USIM card in response to commands of the network 201.

Figure 8:
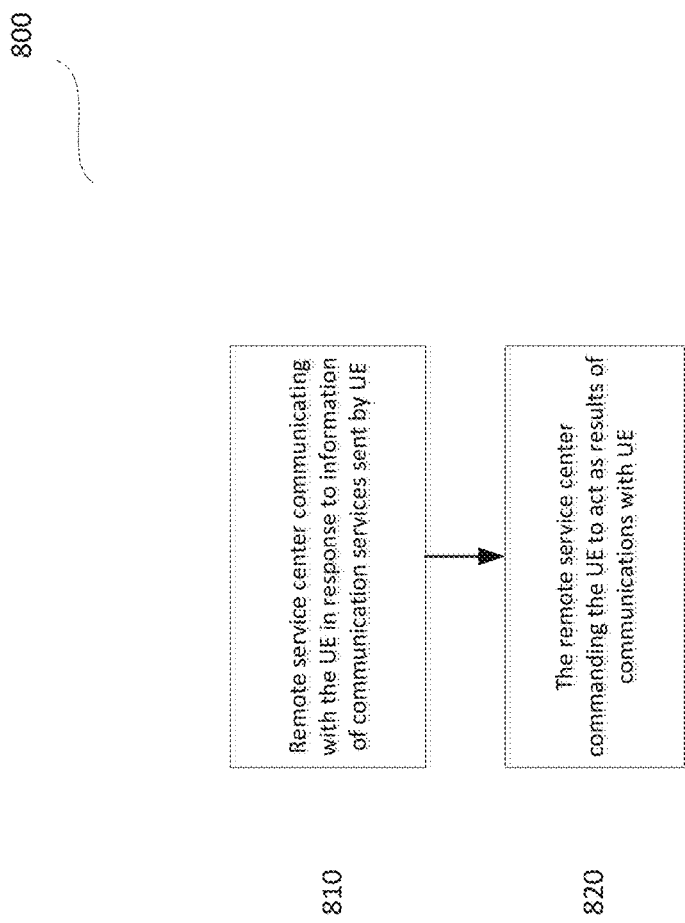
FIG. 8 shows a flow diagram illustrating a fourth example method for recovering from network rejections in accordance with some embodiments.

FIG. 8 shows a flow diagram 800 depicting a fourth example method for recovering network rejections to wireless communication devices.

In 810, the service center 250 may communicate with the wireless communication device 230 via the interface 255 to modify profiles of a first SIM/USIM card or a first virtual SIM card for communication services in response to stored information of communication services. Profiles of SIM/USIM cards, or profiles of virtual SIM cards may be stored at the time of production, and maybe updated through programming over an air interface. Profiles of SIM/USIM cards, or profiles of virtual SIM cards may be stored or updated by network carriers. Profiles of SIM/USIM cards, or profiles of virtual SIM cards may be stored or updated directly on a local server, or a local memory of the service center 250.

In 820, the service center 250 may command the wireless communication device 230 to reset or reconfigure a first SIM/USIM card, or a first virtual SIM/USIM card, or to modify profiles of a first SIM/USIM card, or a first virtual SIM/USIM card.

Figure 9:
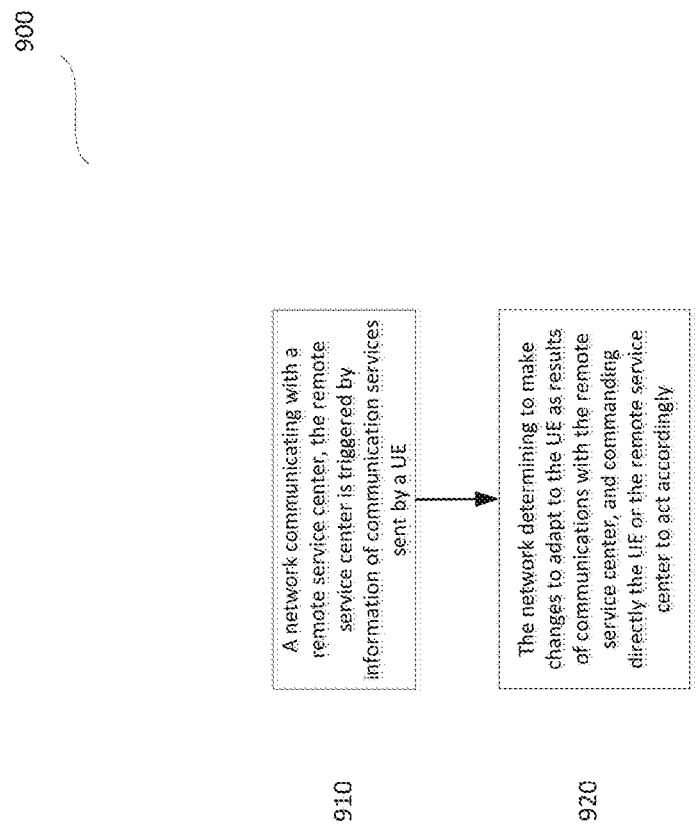
FIG. 9 shows a flow diagram illustrating a fifth example method for recovering from network rejections in accordance with some embodiments.

FIG. 9 shows a flow diagram 900 depicting a fifth example method for recovering network rejections to wireless communication devices.

In 910, the service center 250 may communicate with the network 201 via an interface 256 illustrated by FIG. 2, for example, via internet, for suggestions of changes to the network 201 in response to information of communication services sent by the wireless communication device 230. Profiles of SIM/USIM cards, or profiles of virtual SIM cards may be stored at the time of production, and maybe updated through programming over an air interface. Profiles of SIM/USIM cards, or profiles of virtual SIM cards may be stored or updated by network carriers. Profiles of SIM/USIM cards, or profiles of virtual SIM cards may be stored or updated directly on a local server, or a local memory of the service center 250.

In 920, the service center 250 may communicate with the network 201, and the network 201 may determine to make changes in order to adapt to a first SIM/USIM card, or a first virtual SIM/USIM card. The service center 250 and the network 201 may reach out compromises so that the network 201 may make necessary changes to accommodate the actions to be taken by the wireless communication device 230. In addition, the network 201 may command the wireless communication device 230 to reset, to reconfigure a first SIM/USIM card, or a first virtual SIM/USIM card, or to modify profiles of a first SIM/USIM card, or a first virtual SIM/USIM card.

Figure 10:
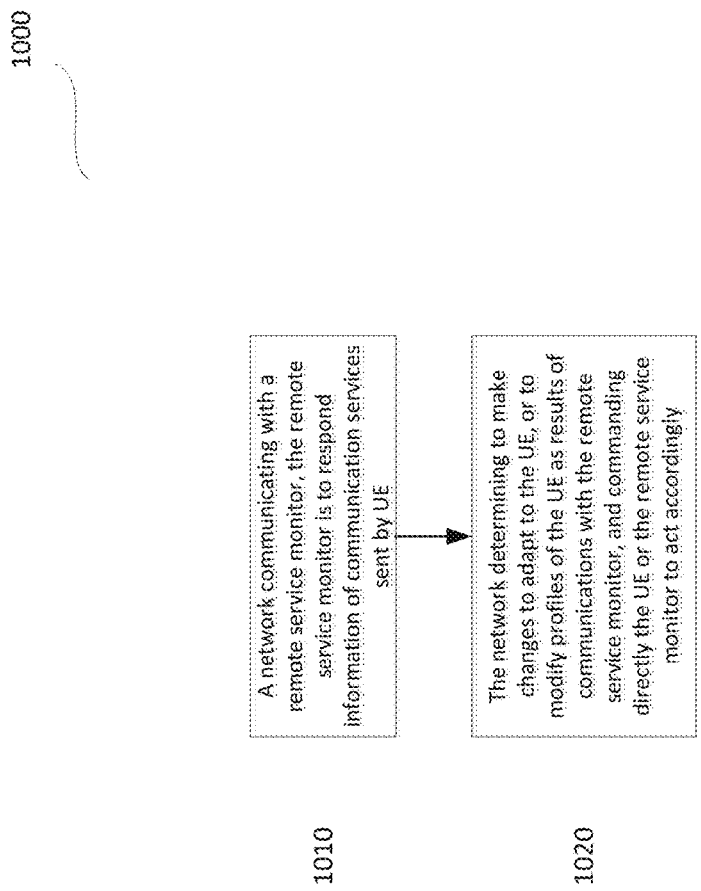
FIG. 10 shows a flow diagram illustrating a sixth example method for recovering from network rejections in accordance with some embodiments.

FIG. 10 shows a flow diagram 1000 depicting a sixth example method for recovering network rejections to wireless communication devices.

In 1010, the remote service monitor 250 may communicate with the wireless communication device 230 via the interface 255 to modify profiles of a first SIM/USIM card or a first virtual SIM card for communication services in response to information of communication services sent by the wireless communication device 230. The remote service monitor 250 may communicate with the network 201 via an interface 256 illustrated by FIG. 2, for example, via internet, for suggestions of changes to the network 201 in response to information of communication services sent by the wireless communication device 230. With the information of communication services, the remote service monitor 250 may communicate with the wireless communication device 230 via the interface 255 and with the network 201 via the interface 256 for compromises from both sides in order to get the wireless communication device 230 back to communication services. Profiles of SIM/USIM cards, or profiles of virtual SIM cards may be stored at the time of production, and maybe updated through programming over an air interface. Profiles of SIM/USIM cards, or profiles of virtual SIM cards may be stored or updated by network carriers. Profiles of SIM/USIM cards, or profiles of virtual SIM cards may be stored or updated directly on a local server, or a local memory of the remote service monitor 250.

In 1020, the remote service monitor 250 may command the wireless communication device 230 to reset or reconfigure a first SIM/USIM card, or a first virtual SIM/USIM card, or to modify profiles of a first SIM/USIM card, or a first virtual SIM/USIM card. The remote service monitor 250 may communicate with the network 201, and the network 201 may determine to make changes in order to adapt to a first SIM/USIM card, or a first virtual SIM/USIM card, or to modify profiles of the first SIM/USIM card, or the first virtual SIM/USIM card. The remote service monitor 250 and the network 201 may reach out compromises so that the remote service monitor 250 may command the wireless communication device 230 to take necessary actions, and the network 201 may make necessary changes to accommodate the actions taken by the wireless communication device 230. In addition, the network 201 may command the wireless communication device 230 to reset, to reconfigure a first SIM/USIM card, or a first virtual SIM/USIM card, or to modify profiles of a first SIM/USIM card, or a first virtual SIM/USIM card.

Figure 11:
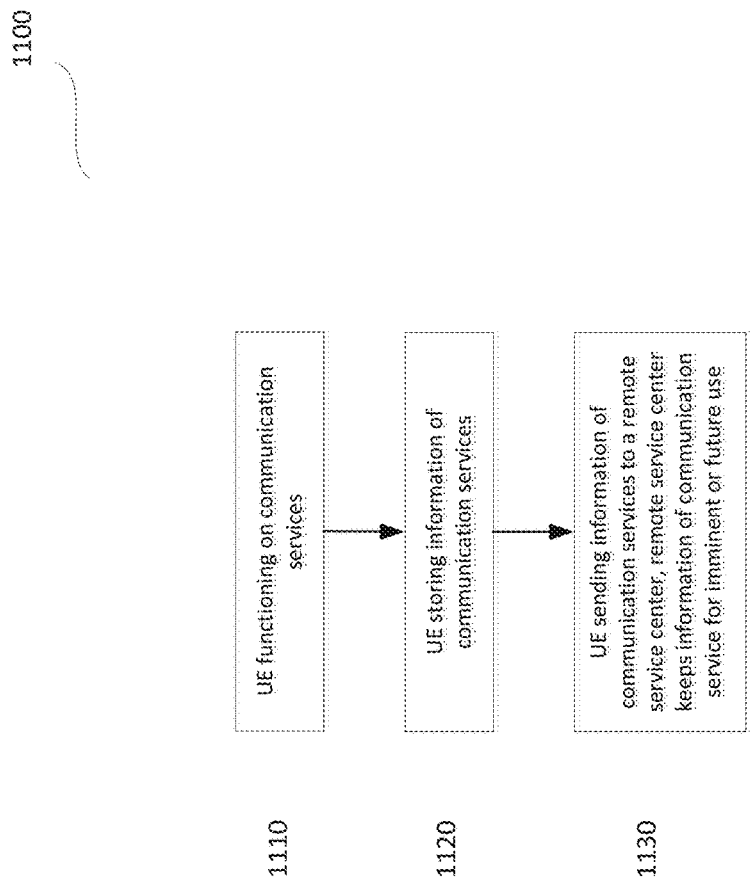
FIG. 11 shows a flow diagram illustrating a seventh example method for recovering from network rejections in accordance with some embodiments.

FIG. 11 shows a flow diagram 1100 depicting a seventh example method for recovering network rejections to wireless communication devices.

In 1110, a wireless communication device, for example, wireless communication device 230 communicates with wireless communication systems, for example, wireless communication system 205 and/or 206 covered by a network, for example, network 201, as illustrated by FIG. 2. The wireless communication device 230 communicates with a remote service monitor as well, for example, remote service monitor 250. The remote service monitor 250 independently communicates with the network 201, including the wireless communication system 205 and/or 206. The network 201 may be, for example, UTRAN and/or GERAN. The network 201 may be also, for example, an E-UTRAN. The wireless communication systems 205 and 206 may apply GSM, EDGE, UMTS, LTE, or 5G.

In 1120, the wireless communication device 230 stores information of communication services of a first SIM/USIM card that is located within the wireless communication device 230, or a first virtual SIM card that is supported by the wireless communication device 230. Information of communication services may be stored on a second SIM/USIM card that is located within the wireless communication device 230. The information of communication services may be stored on a virtual SIM card in an event that a first SIM/USIM card operates on the communication services, or a second virtual SIM card that is supported by the wireless communication device 230. Information of communication services may be stored on the wireless communication device 230's memory. Information of communication services may be stored on a memory of the wireless communication device 230 that is dedicated for the information of the communication services. Information of communication services may be updated over the time of communications. For example, in a dual-SIM scenario, a user may switch between the two SIM for different network carriers.

In 1130, the wireless communication device 230 may send the information of communication services to the remote service monitor 250 through normal network or a backup network. For example, in a GSM/UMTS multi-mode, the wireless communication device 230 may send the information of communication services to the remote service monitor 250 through a normal network, for example, a PS network, or through a backup network, for example, a CS network. For example, in a GSM/UMTS multi-mode, the wireless communication device 230 may send the information of communication services to the remote service monitor 250 through a normal network, for example, a CS network, or through a backup network, for example, a PS network. The wireless communication device 230 may send the information of communication services via an interface 255 illustrated by FIG. 2, for example, an SMS. The remote service monitor 250 may keep information of communication service of the wireless communication device 230 for imminent or future use, for example, for recovering from network rejections to the wireless communication device 230.

Figure 12:
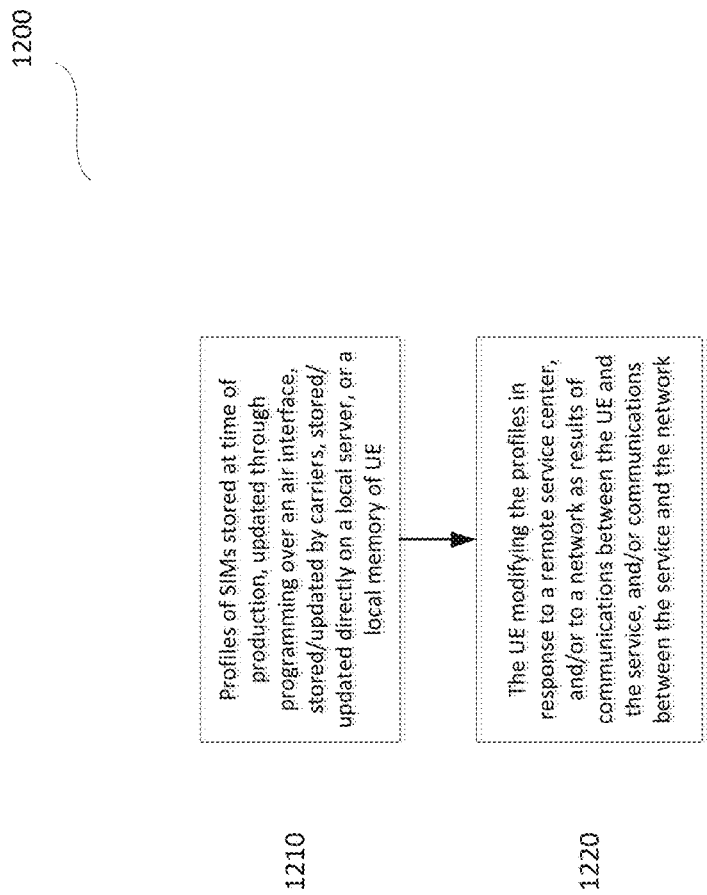
FIG. 12 shows a flow diagram illustrating an eighth example method for recovering from network rejections in accordance with some embodiments

FIG. 12 shows a flow diagram 1200 depicting an eighth example method for recovering network rejections to wireless communication devices.

In 1210, profiles of SIM/USIM cards, or profiles of virtual SIM cards may be stored at the time of production, and maybe updated through programming over an air interface. Profiles of SIM/USIM cards, or profiles of virtual SIM cards may be stored or updated by network carriers. Profiles of SIM/USIM cards, or profiles of virtual SIM cards may be stored or updated directly on a local server, or a local memory of the service center 250.

In 1220, the service center 250 may command the wireless communication device 230 to reset or reconfigure a first SIM/USIM card, or a first virtual SIM/USIM card, or to modify profiles of a first SIM/USIM card, or a first virtual SIM/USIM card. The service center 250 may communicate with the network 201, and the network 201 may make changes in order to adapt to a first SIM/USIM card, or a first virtual SIM/USIM card. The service center 250 and the network 201 may reach out compromises so that the service center 250 may command the wireless communication device 230 to take necessary actions, and the network 201 may make necessary changes to accommodate the actions taken by the wireless communication device 230. In addition, the network 201 may command the wireless communication device 230 to reset, to reconfigure a first SIM/USIM card, or a first virtual SIM/USIM card, or to modify profiles of a first SIM/USIM card, or a first virtual SIM/USIM card.

The following examples pertain to further embodiments.

Example 1 is a wireless communication device illustrated by FIG. 5.

In Example 2, the subject matter of Example 1 may optionally include the processor being to trigger a switch from the first SIM or the first virtual SIM to the second SIM or the second virtual SIM based on the reject message.

In Example 3, the subject matter of any one of Examples 1-2 may optionally include the second communication module circuitry being to transmit a register request to the second network and to receive a registration accept message from the second network.

In Example 4, the subject matter of any one of Examples 1-3 may optionally include the second communication module circuitry being to transmit a Short Message Service (SMS) message with the information to the remote service monitor.

In Example 5, the subject matter of any one of Examples 1-4 may optionally include the second communication module circuitry being to receive a command from the remote service monitor, wherein the command is to restart the wireless communication device, to reset the first SIM or the first virtual SIM of the first communication module circuitry, or to modify profiles of the first SIM or the first virtual SIM of the first communication module circuitry.

In Example 6, the subject matter of Example 5 may optionally include the command being a short message service (SMS) command or a Dual-Tone Multi-Frequency signaling (DTMF) command.

In Example 7, the subject matter of any one of Examples 5-6 may optionally include the processor being to restore the communications with the first network based on the command, and to disconnect the second communication module circuitry from the second network based on the restored communications with the first network.

In Example 8, the subject matter of any one of Examples 1-7 may optionally include the wireless communication device being to operate in Long-Term Evolution (LTE) single mode and the first network is a Packet Switch (PS) network, and the second network is a Circuit Switch (CS) network.

In Example 9, the subject matter of any one of Examples 1-7 may optionally include the wireless communication device being to operate in Global System for Mobile communications (GSM) or Universal Mobile Telecommunication System (UMTS) multi-mode and the first network is a PS network or a CS network, and the second network is a PS network or a CS network.

In Example 10, the subject matter of any one of Examples 1-9 may optionally include the wireless communication device being an Internet of Things (IoT) device.

Example 11 is an apparatus for communications illustrated by FIG. 10.

In Example 12, the subject matter of Example 11 may optionally include the processor being to determine, based on the received communication signals, to modify the network, and to modify the profiles of the wireless communication device coupled with the network accordingly.

In Example 13, the subject matter of any one of Examples 11-12 may optionally include a transmitter to transmit a command to modify the profiles of the wireless communication device to a remote service monitor that remotely administers the wireless communication device, or to the wireless communication device directly.

In Example 14, the subject matter of any one of Examples 11-13 may optionally include the profiles of the wireless communication device include software configurations representing working conditions for the wireless communication device, and the profiles of the wireless communication device being defined at time of production, and updated through programming over an air interface by producers or by carriers for the network.

In Example 15, the subject matter of any one of Examples 11-14 may optionally include the modifications to the network including renew of subscriptions of the network, update of Home Location Register (HLR) with details of the wireless communication device, or reset of a database of the network.

Example 16 is a method for remotely administering devices illustrated by FIG. 6.

In Example 17, the subject matter of Example 16 may optionally include determining, based on the analysis, modifications to the profiles of the wireless communication device, and generating a response for the modifications, or determining, based on the analysis, changes to the network to adapt to the wireless communication device, and generating a response for the changes.

In Example 18, the subject matter of Example 17 may optionally include transmitting the response for the modifications to the wireless communication device, or transmitting the response for the changes to the network.

In Example 19, the subject matter of any one of Examples 16-18 may optionally include generating and causing transmission of reset instructions for the wireless communication device.

In Example 20, the subject matter of Example 19 may optionally include the reset instructions being to instruct the wireless communication device to reset a subscriber information module or an error code.

In Example 21, the subject matter of Example 19 may optionally include the reset instructions being to be transmitted by Short Messaging Service (SMS) or by Dual Tone Multi-Frequency signaling (DTMF).

Example 22 is a computer readable medium having recorded instructions thereon which, when executed by one or more processors, make the one or more processors perform a method for remotely administering devices according to any one of Examples 16 to 21.

Example 23 is a wireless communication device for recovering from network rejections illustrated by FIG. 7.

In Example 24, the subject matter of Example 23 may optionally include the one or more processors being further made to reset or to reconfigure a first Subscriber Identity Module (SIM) card located within the wireless communication device for the first network, or to modify profiles of the first SIM card located within the wireless communication device for the first network in response a command sent by the service center.

In Example 25, the subject matter of any one of Examples 23-24 may optionally include the one or more processors being further made to modify profiles of a first Subscriber Identity Module (SIM) card located within the wireless communication device for the first network in response to a command sent by the second network.

In Example 26, the subject matter of any one of Examples 23-25 may optionally include the wireless communication device being to operate in Global System for Mobile communications (GSM) or Universal Mobile Telecommunication System (UMTS) multi-mode, and the second network is a Packet Switching (PS) or a Circuit Switching (CS) network.

In Example 27, the subject matter of any one of Examples 23-25 may optionally include the wireless communication device being to operate in Long Term Evolution (LTE) single mode, and the second network is a Circuit Switching (CS) network.

In Example 28, the subject matter of Example 27 may optionally include services of the Circuit Switching (CS) network being disabled during the communication services with the first network.

In Example 29, the subject matter of any one of Examples 23-27 may optionally include the wireless communication device being an Internet of Things (IoT) device.

Example 30 is a wireless communication device illustrated by FIG. 12.

In Example 31, the subject matter of Example 30 may optionally include the command being sent by a service center of the wireless communication system that is to remotely administer the wireless communication device.

In Example 32, the subject matter of Example 30 may optionally include the command being sent by a second network of the wireless communication system.

In Example 33, the subject matter of any one of Examples 30-32 may optionally include the profiles of the plurality of SIM cards of the wireless communication device being made at time of production, and being updated through programming over an air interface by producers or by carriers.

In Example 34, the subject matter of any one of Examples 30-33 may optionally include the profiles of the plurality of the SIM cards of the wireless communication device including software configurations that act as working conditions for the wireless communication device.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

The term "computer-readable media" includes computer-storage media. In one embodiment, computer-readable media is non-transitory. For example, computer-storage media may include, but are not limited to, magnetic storage devices (e.g., hard disk, floppy disk, and magnetic strips), optical disks (e.g., Compact Disk (CD) and Digital Versatile Disk (DVD)), smart cards, flash memory devices (e.g., thumb drive, stick, key drive, and SD cards), and volatile and non-volatile memory (e.g., Random Access Memory (RAM), Read-Only Memory (ROM)).

The invention claimed is:

1. A wireless communication device, comprising:
a first communication module circuitry to communicatively couple the wireless communication device with a first network, the first communication module circuitry to receive a reject message from the first network to disable communications with the first network;
a processor to store, in memory, information corresponding to the communications with the first network; and
a second communication module circuitry to communicatively couple the wireless communication device with a second network, the second communication module circuitry to send the information to a remote service monitor, wherein the second communication module circuitry is to receive a short message service (SMS) command or a Dual-Tone Multi-Frequency signaling (DTMF) command from the remote service monitor;
wherein the first communication module circuitry includes a first Subscriber Identity Module (SIM) or a first virtual SIM and the second communication module circuitry includes a second SIM or a second virtual SIM.

2. The wireless communication device of claim 1, wherein the processor is to trigger a switch from the first SIM or the first virtual SIM to the second SIM or the second virtual SIM based on the reject message.

3. The wireless communication device of claim 2, wherein the second communication module circuitry is to transmit a register request to the second network and to receive a registration accept message from the second network.

4. The wireless communication device of claim 3, wherein the second communication module circuitry is to transmit a Short Message Service (SMS) message with the information to the remote service monitor.

5. The wireless communication device of claim 4, wherein the command from the remote service monitor is to restart the wireless communication device, to reset the first SIM or the first virtual SIM of the first communication module circuitry, or to modify profiles of the first SIM or the first virtual SIM of the first communication module circuitry.

6. The wireless communication device of claim 5, wherein, the processor is to restore the communications with the first network based on the command, and to disconnect the second communication module circuitry from the second network based on the restored communications with the first network.

7. The wireless communication device of claim 1, wherein the wireless communication device is to operate in Long-Term Evolution (LTE) single mode and the first network is a Packet Switch (PS) network, and the second network is a Circuit Switch (CS) network.

8. The wireless communication device of claim 1, wherein the wireless communication device is to operate in Global System for Mobile communications (GSM) or Universal Mobile Telecommunication System (UMTS) multimode and the first network is a PS network or a CS network, and the second network is a PS network or a CS network.

9. The wireless communication device of claim 1, wherein the wireless communication device is an Internet of Things (IoT) device.

* * * * *